March 9, 1971 L. D. ZMANIA 3,568,272
APPARATUS FOR PRODUCING MASONRY BLOCKS AND THE LIKE
Filed Sept. 12, 1967 15 Sheets-Sheet 4

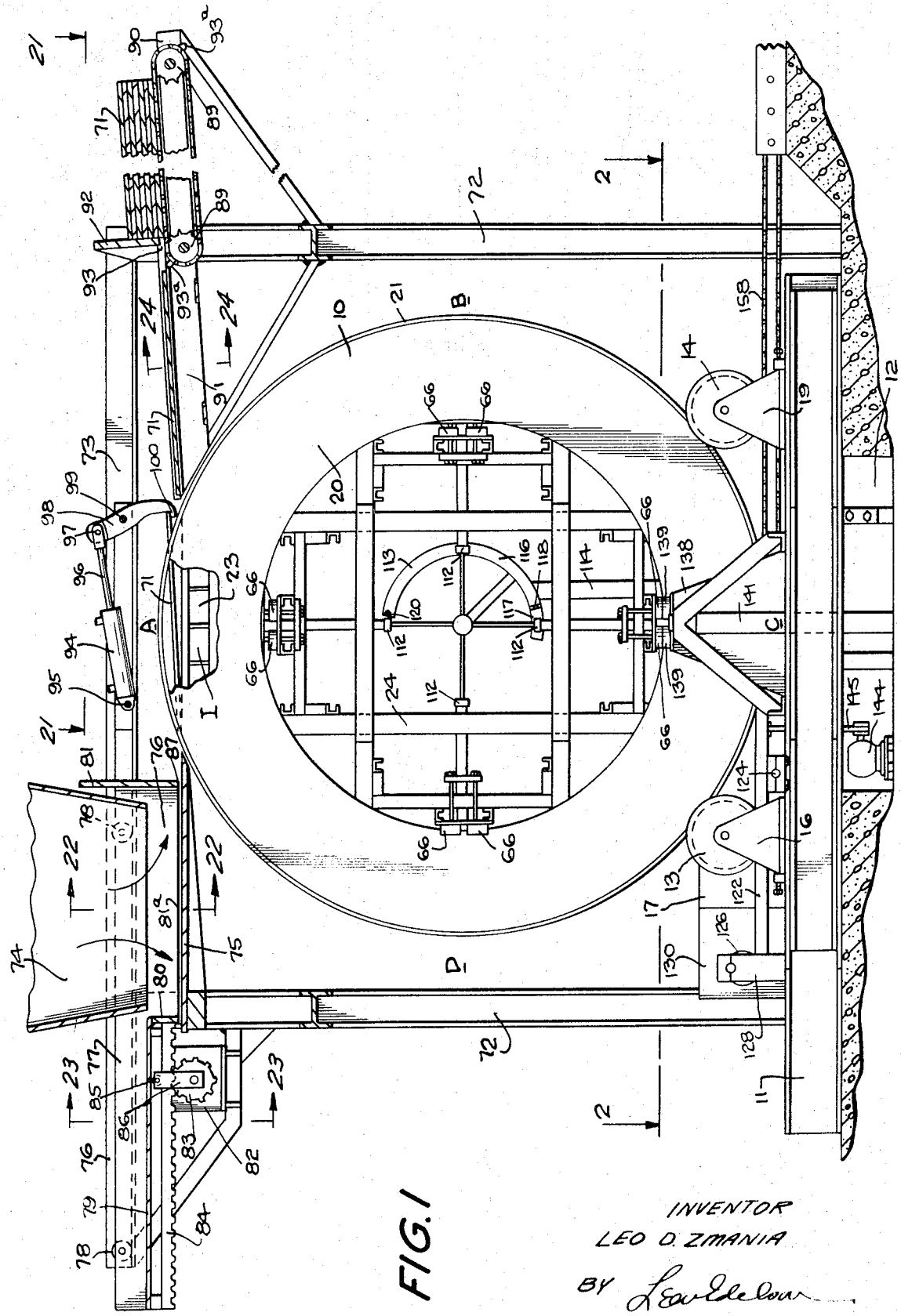

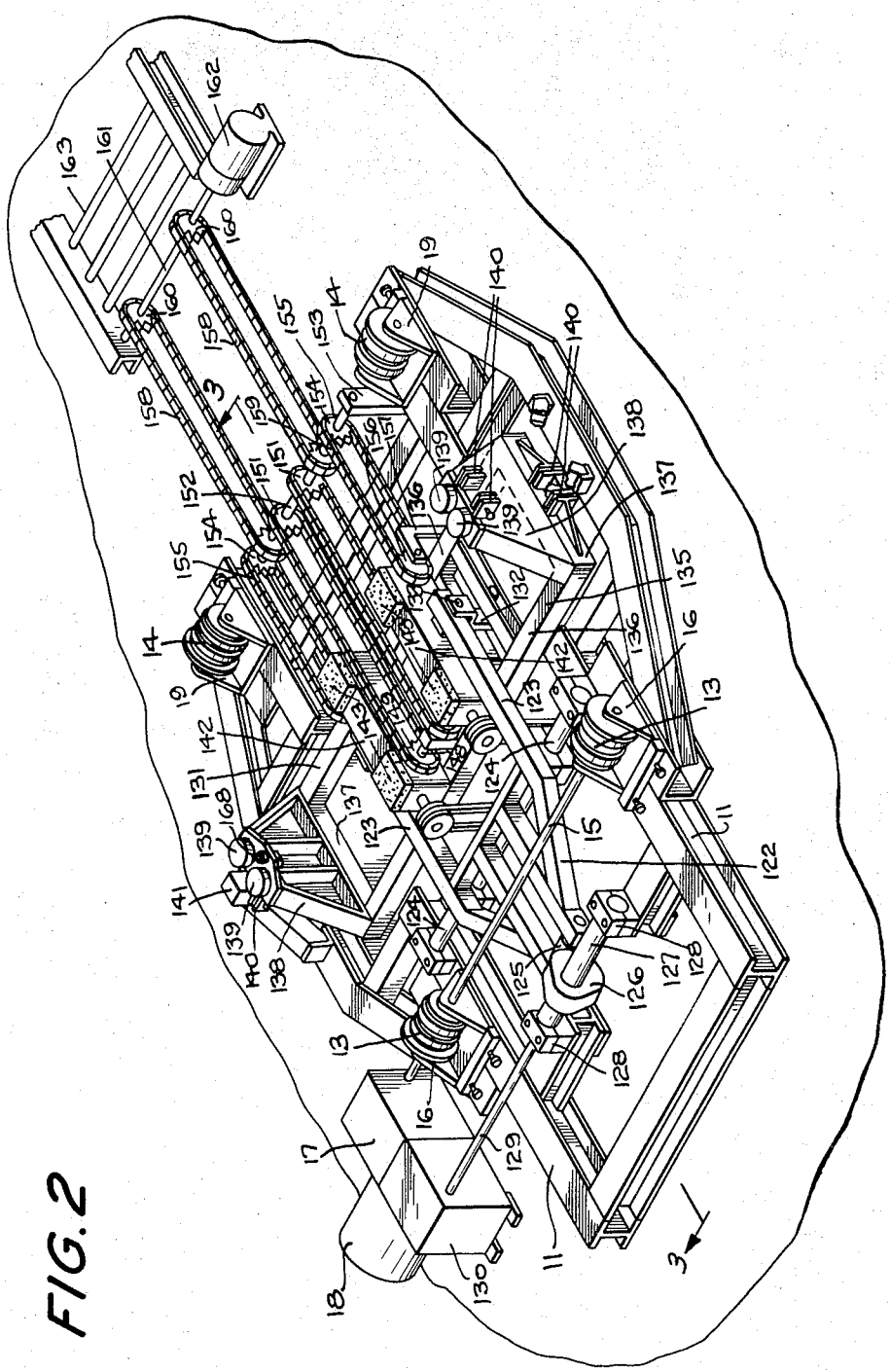

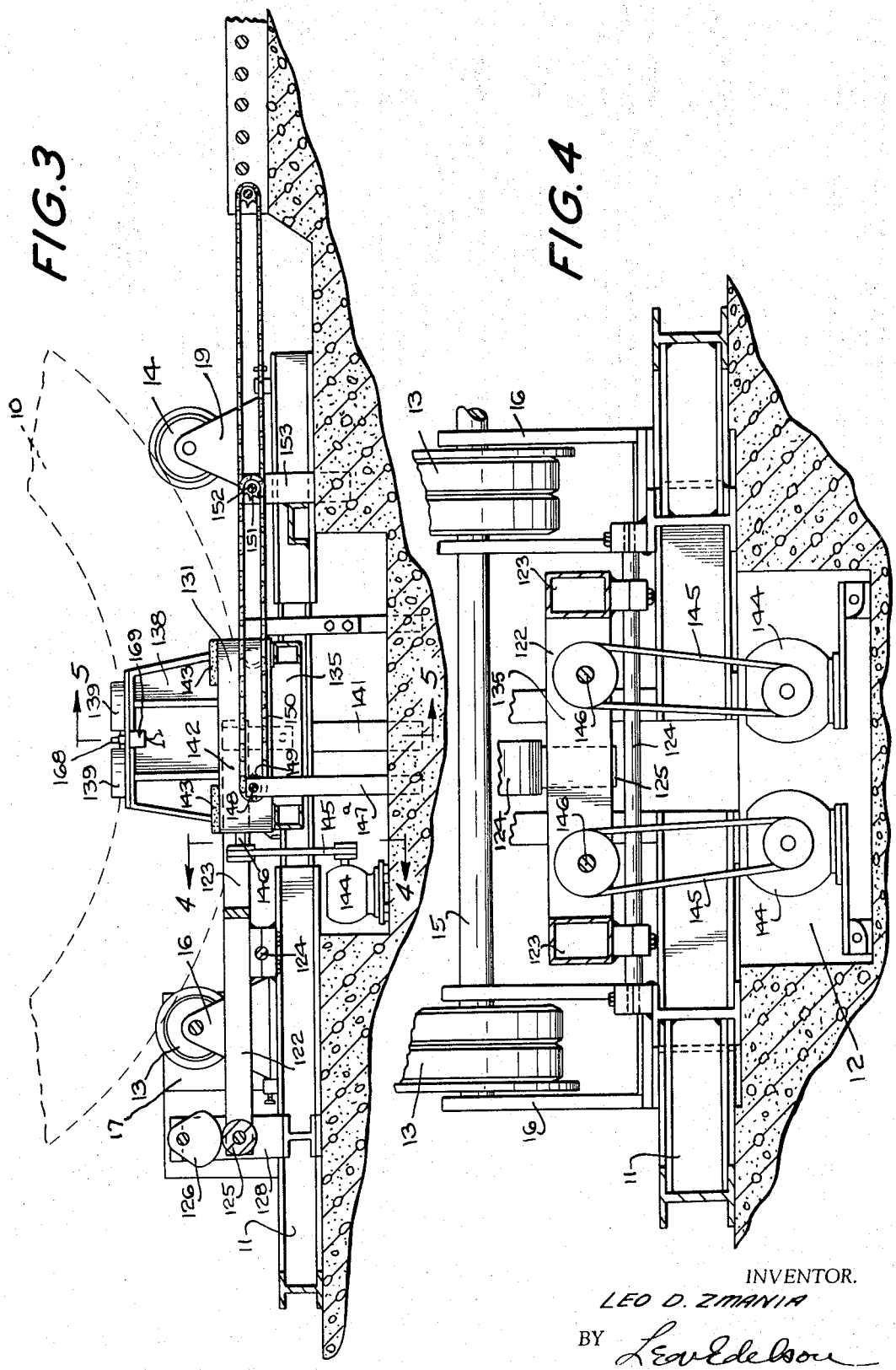

INVENTOR.
LEO D. ZMANIA
BY
ATTORNEY

March 9, 1971  L. D. ZMANIA  3,568,272
APPARATUS FOR PRODUCING MASONRY BLOCKS AND THE LIKE
Filed Sept. 12, 1967  15 Sheets-Sheet 5

INVENTOR.
LEO D. ZMANIA
BY Leo Edelson
ATTORNEY

March 9, 1971  L. D. ZMANIA  3,568,272
APPARATUS FOR PRODUCING MASONRY BLOCKS AND THE LIKE
Filed Sept. 12, 1967  15 Sheets-Sheet 7
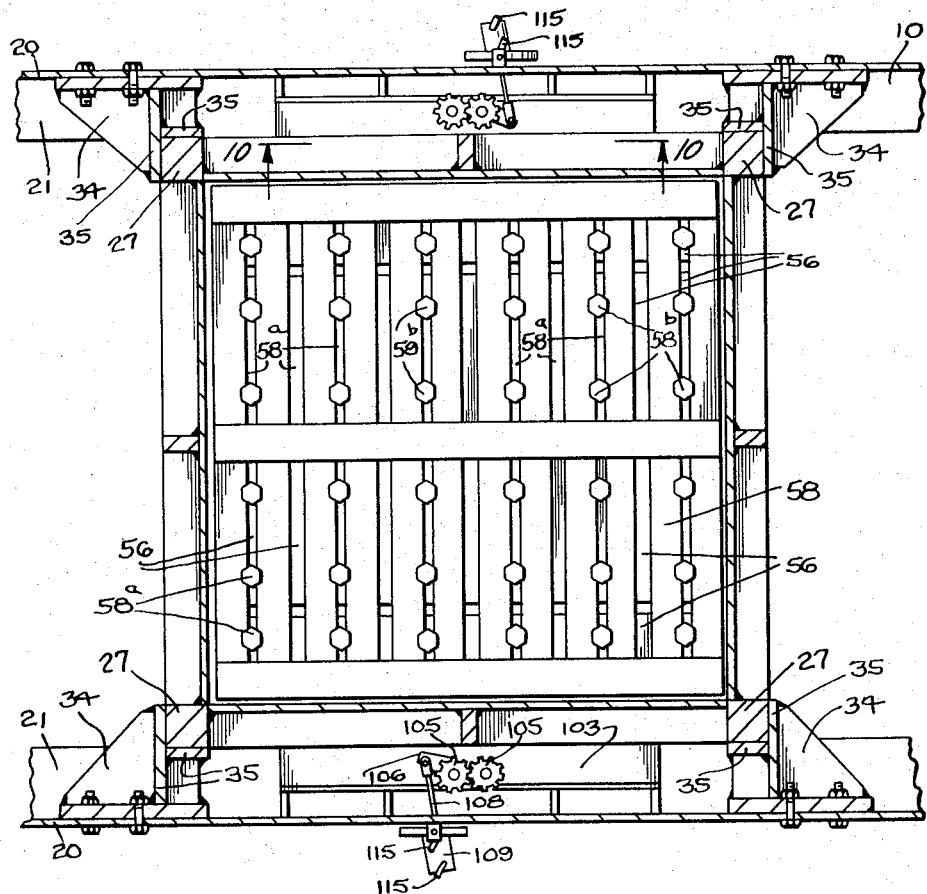
FIG. 9
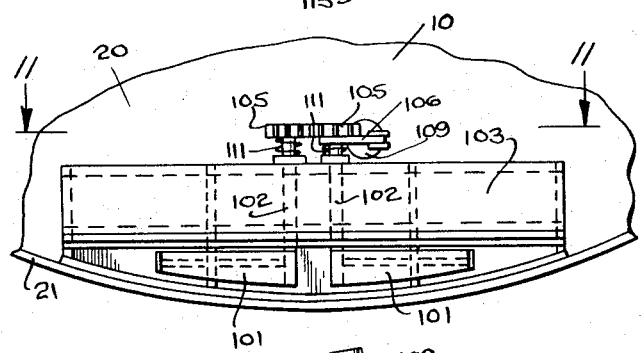
FIG. 10
FIG. 11
INVENTOR.
LEO D. ZMANIA
BY Leo Edelson
ATTORNEY

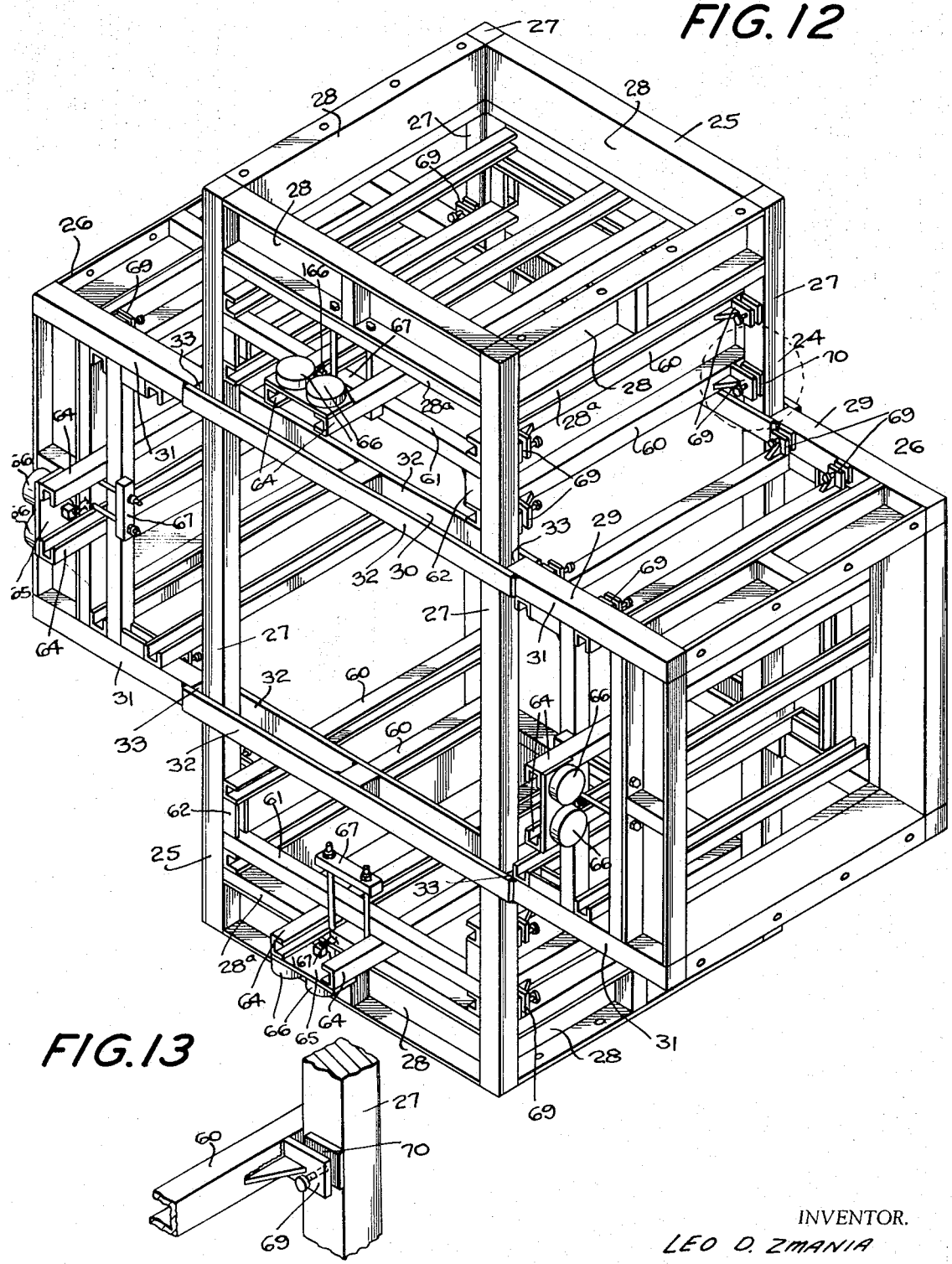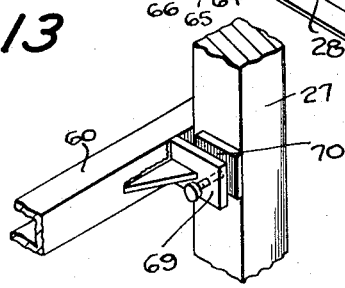

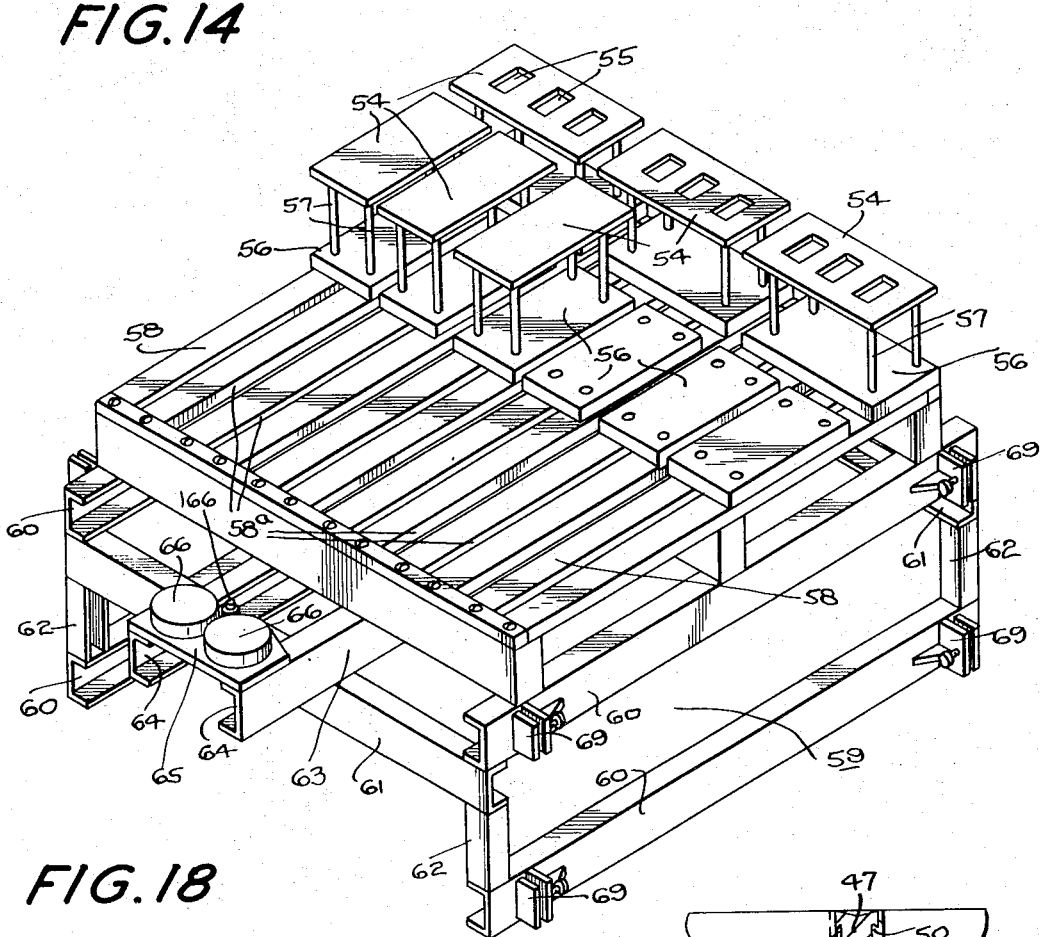

March 9, 1971      L. D. ZMANIA      3,568,272
APPARATUS FOR PRODUCING MASONRY BLOCKS AND THE LIKE
Filed Sept. 12, 1967      15 Sheets-Sheet 10

INVENTOR
LEO O. ZMANIA
BY Leo Edelson
ATTORNEY

March 9, 1971 L. D. ZMANIA 3,568,272
APPARATUS FOR PRODUCING MASONRY BLOCKS AND THE LIKE
Filed Sept. 12, 1967 15 Sheets-Sheet 11

INVENTOR
LEO D. ZMANIA
BY Leo Edelson
ATTORNEY

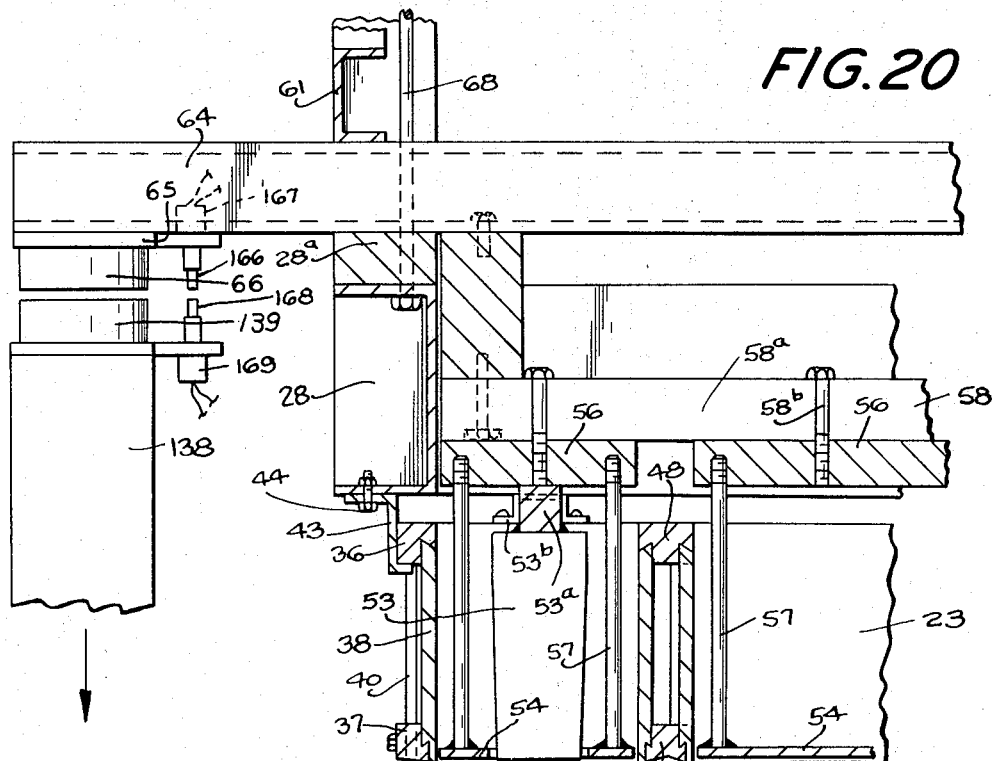
FIG.20
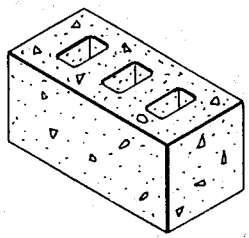
FIG.25
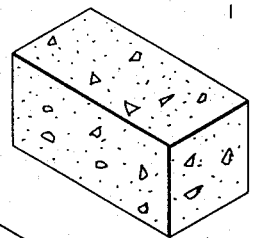
FIG.26
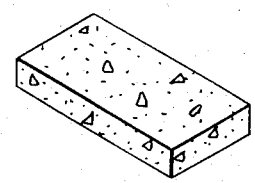
FIG.27
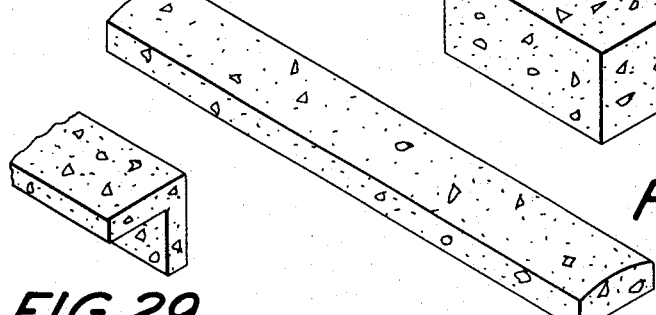
FIG.28
FIG.29
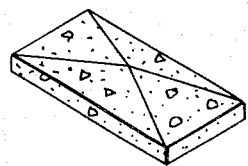
FIG.30

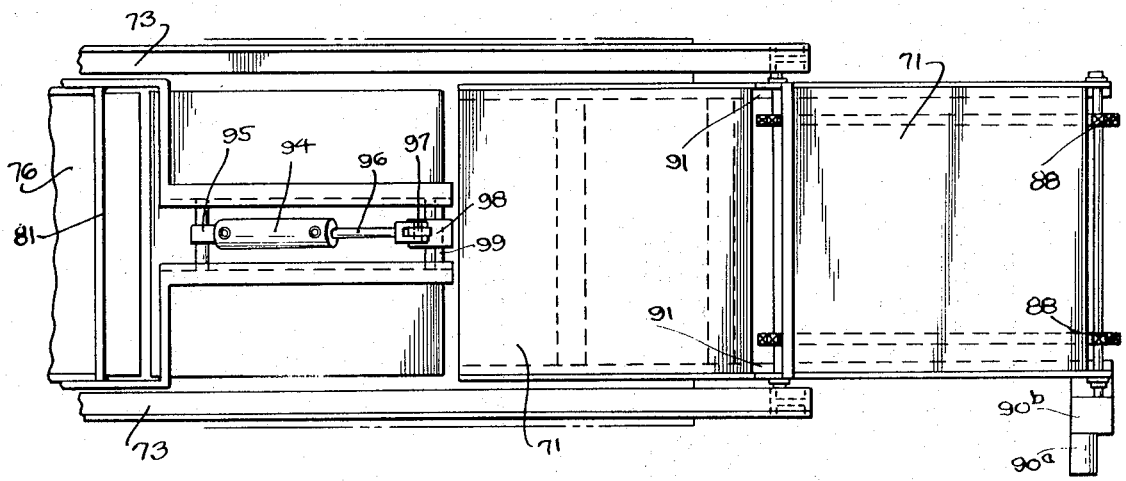
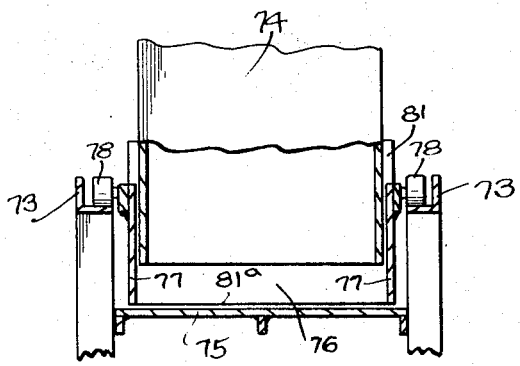
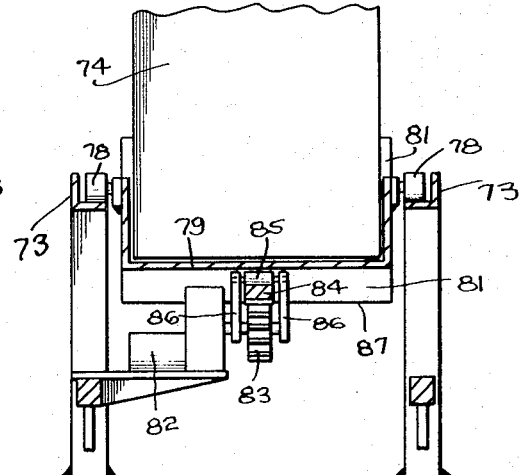
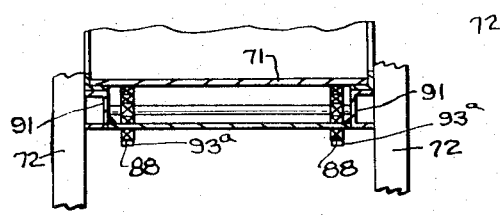

OPERATING CYCLE FOR A SINGLE MOLD BOX

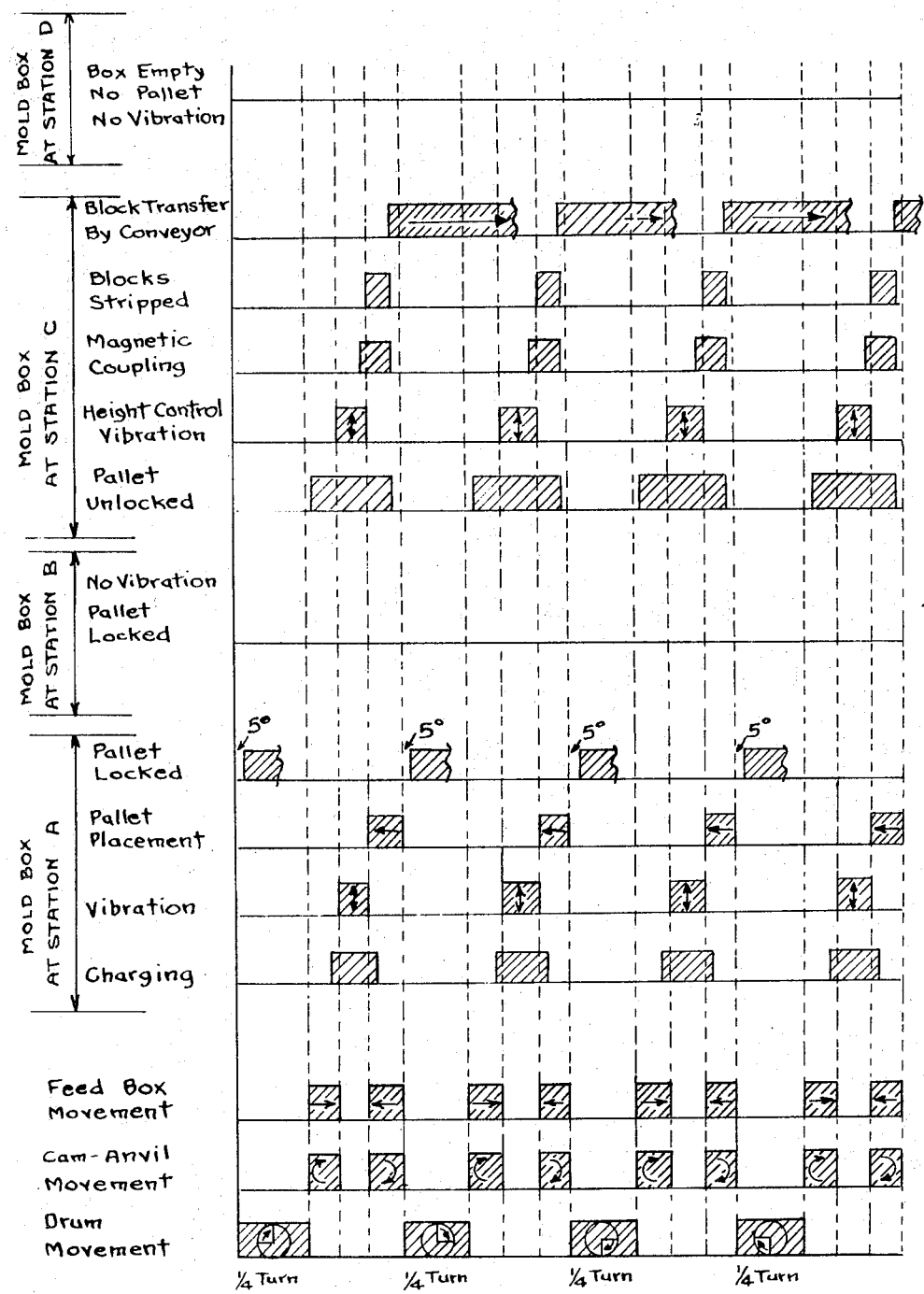

United States Patent Office 3,568,272
Patented Mar. 9, 1971

3,568,272
APPARATUS FOR PRODUCING MASONRY BLOCKS AND THE LIKE
Leo D. Zmania, 4580 S. 14th St.,
Milwaukee, Wis. 53221
Filed Sept. 12, 1967, Ser. No. 667,112
Int. Cl. B28b *15/00*
U.S. Cl. 25—2    18 Claims

ABSTRACT OF THE DISCLOSURE

A concrete block forming machine which basically includes a revoluble drum having mounted within its interior for rotation about a horizontal axis a plurality of mold boxes which are uniformly spaced circumferentially about the axis of rotation of the drum, for movement successively from a station located at the top of the drum at which a mold box is charged with concrete to a station located at the bottom of the drum at which the mold box is stripped of the concrete block formed therein. In the machine as disclosed the mold boxes are four in number and so are spaced ninety degrees apart, with each box moving through an arc of 180 degrees from the mold charging station to the block stripping station. In addition to the revoluble drum with its interiorly mounted mold boxes, the machine includes in the base thereof operating mechanism for effecting rotation of the drum and thus successive positionment of the several mold boxes at the concrete charging station, which operating mechanism also includes means for effecting vibration of each of the mold boxes during the interval of time that it is being charged with concrete as well as during an interval just prior to its being stripped of the block formed therein.

---

This invention relates generally to block manufacturing and more particularly to an improved apparatus for and method of producing concrete molded blocks and other structural elements of predetermined shape.

Among the principal objects of the present invention is to provide an apparatus for and method of automatically charging with concrete mix or other suitable block forming plastic composition one block-forming mold simultaneously as another mold already filled with the block forming composition is stripped of its complement of the blocks formed therein.

Another object of the invention is to provide a plurality of mold boxes arranged in uniformly spaced relation about a single axis of rotation to successively present a pair of said mold boxes in vertically spaced relation with the uppermost mold box having its upper end open for receiving a charge of concrete mix or the like and the lowermost mold box inverted for discharge of the blocks formed therein downwardly out of their mold box, the charging of the upper mold box with concrete being effected simultaneously as the lower mold box is stripped of its formed blocks.

Still another important object of the invention is to provide an apparatus in which a revolving system of mold boxes is employed to successively move each of them first into a stationary position in which the mold box is filled with the block-forming composition and then into another stationary position from which the mold box is stripped of its blocks for transfer away from the apparatus.

Another important object of the invention is to provide a revolving system of mold boxes wherein pairs of the same spaced 180 degrees apart are respectively brought into positional registry with vertically spaced mold box charging and mold box unloading stations, whereby as one mold box of the pair is being filled with its complement of the block-forming composition, such as a suitable concrete mix, the other mold box is being stripped of the blocks formed therein and so materially speed up the production of the blocks.

More specifically, an important object of the invention is to provide a revoluble drum having mounted therein for rotation about a horizontal axis a plurality of mold boxes uniformly spaced about the drum circumference for movement successively from a mold charging station located at the top of the drum to a block discharging station at the bottom of the drum, the revoluble drum being so intermittently rotated as to hold the mold boxes at said stations for a controlled interval of time sufficient to vibrate the concrete mass in the mold boxes to a desired degree of compactness and density and thus insure production of blocks of uniform predetermined height.

Another specific object of the invention is to provide means for positioning a block-supporting pallet over each mold box as the same is filled at the mold charging station, which pallet for each mold box then serves automatically as the support for the blocks not only as they are stripped from the mold box at the block discharging station but also as they are transferred from the block-forming machine to the curing kiln or other place of storage of the uncured blocks.

A further object of the invention is to provide a vertically movable anvil assembly at the block unloading station which operates alternately with rotation of the aforesaid mold-box supporting drum so that following each turn of the drum to place one mold box at its concrete filling station and another mold box at its block-discharging station, the anvil assembly simultaneously subjects both of said boxes to vibration for a period of time adequate to compact the concrete mass in the mold box to a predetermined height and density.

Still another object is to provide each mold box with a stripper shoe assembly which is movable in the mold box as the same is vibrated to compress the concrete mass therein to a predetermined depth as measured between the stripper shoe and the covering pallet of a given mold box while the latter is supported by the anvil at the block discharging station.

A still further object is to provide means which is automatically operative when the desired depth aforesaid of the block is established to couple the stripper shoe to the anvil assembly so that their combined weight serves upon down travel of the anvil to initiate extrusion of the formed blocks from the mold box while the same are supported upon the pallet associated with said mold box.

A further important object of the invention is to provide a concrete charging mechanism at the top of the machine which is operative as each empty mold box is rotated into and brought to rest at the mold box filling station to completely fill the mold with a charge of the concrete mix, level off the top surface of said charge and place over it a pallet which serves not only as a closure for the open end of the mold box but also as the support for the molded blocks as they are stripped from the mold box at the block-discharging station and transferred away from the machine.

Other important objects of the present invention are to provide a mold box which is readily adapted to be converted into various shapes, sizes and number of cavities therein for producing different shapes of molded objects; to provide contoured stripper shoes which are designed to produce as desired differently shaped top surfaces for the molded blocks; to provide core elements adapted to be variously positioned in the mold box for producing hollow blocks of predetermined shape and design; to enable the simultaneous production during operation of the machine of different forms and shapes of molded blocks with a single preliminary set-up of the machine; and to generally render more economical and at the same time materially increase the rate of production of concrete blocks.

Other objects and advantages of the present invention will appear more fully hereinafter, it being understood that said invention consists substantially in the combination, construction, location and relative arrangement of the several parts of the apparatus, and in the method of producing the blocks, all as described in detail in the following specification, as shown in the accompanying drawings and as finally pointed out in the appended claims.

In the accompanying drawings:

FIG. 1 is a side elevational view of the block forming machine constructed in accordance with and embodying the principles of the present invention with certain portions of the machine and its supporting structure shown in section;

FIG. 2 is a perspective view showing the supporting base anvil assembly and operating mechanism of the machine substantially as viewed from the line 2—2 of FIG. 1;

FIG. 3 is a longitudinal vertical sectional view as taken along the line 3—3 of FIG. 2 showing the anvil assembly in its fully elevated position;

FIG. 4 is a transverse vertical sectional view as taken along the line 4—4 of FIG. 3;

FIG. 9 is a horizontal sectional view as taken along the line 9—9 of FIG. 8 showing the block discharge end of the mold box at the bottom station of the machine and the means for positioning in the mold box various arrangements of stripper shoes;

FIG. 10 is a plan view as taken along the line 10—10 of FIG. 9 showing one set of the several sets of pallet grippers which are mounted in spaced relation about the interior of the drum;

FIG. 11 is a sectional view of the pallet grippers as taken along the line 11—11 of FIG. 10;

FIG. 12 is a perspective view of the mold box supporting frame structure of the machine disposed interiorly of the drum portion thereof, certain portions of this frame structure being visible through the central opening of the drum as shown in FIG. 1; this frame being shown without any of the mold boxes or stripper shoes mounted thereon;

FIG. 13 is a perspective view of a structural detail embraced by the dotted line circle 13 of FIG. 12;

FIG. 14 is a perspective view of the stripper frame and its associated mold box stripper shoes for one multiple cavity mold box as is mounted upon one end of the supporting frame of FIG. 12;

FIG. 18 is a transverse sectional view through a mold box as taken along the line 18—18 of FIG. 16;

FIG. 19 is another transverse sectional view through a mold box as taken along the line 19—19 of FIG. 18;

FIG. 20 is a partial sectional view showing a mold box in block-stripping position at the bottom of the machine with the block-stripper shoes in their fully extended position and the formed blocks completely stripped from the mold box;

FIG. 21 is a top plan view as seen from the line 21—21 of FIG. 1 of the pallet delivery mechanism operatively arranged at the top of the machine for successively feeding pallets into covering relation to the concrete-filled mold boxes;

FIG. 22 is a vertical sectional view through the concrete feed hopper and its associated parts as taken along the line 22—22 of FIG. 1;

FIG. 23 is a vertical sectional view through the drawer for feeding concrete from the hopper to the mold box as taken along the line 23—23 of FIG. 1;

FIG. 24 is a vertical sectional view as taken along the line 24—24 of FIG. 1 of the pallet feeding mechanism;

Figure 31:
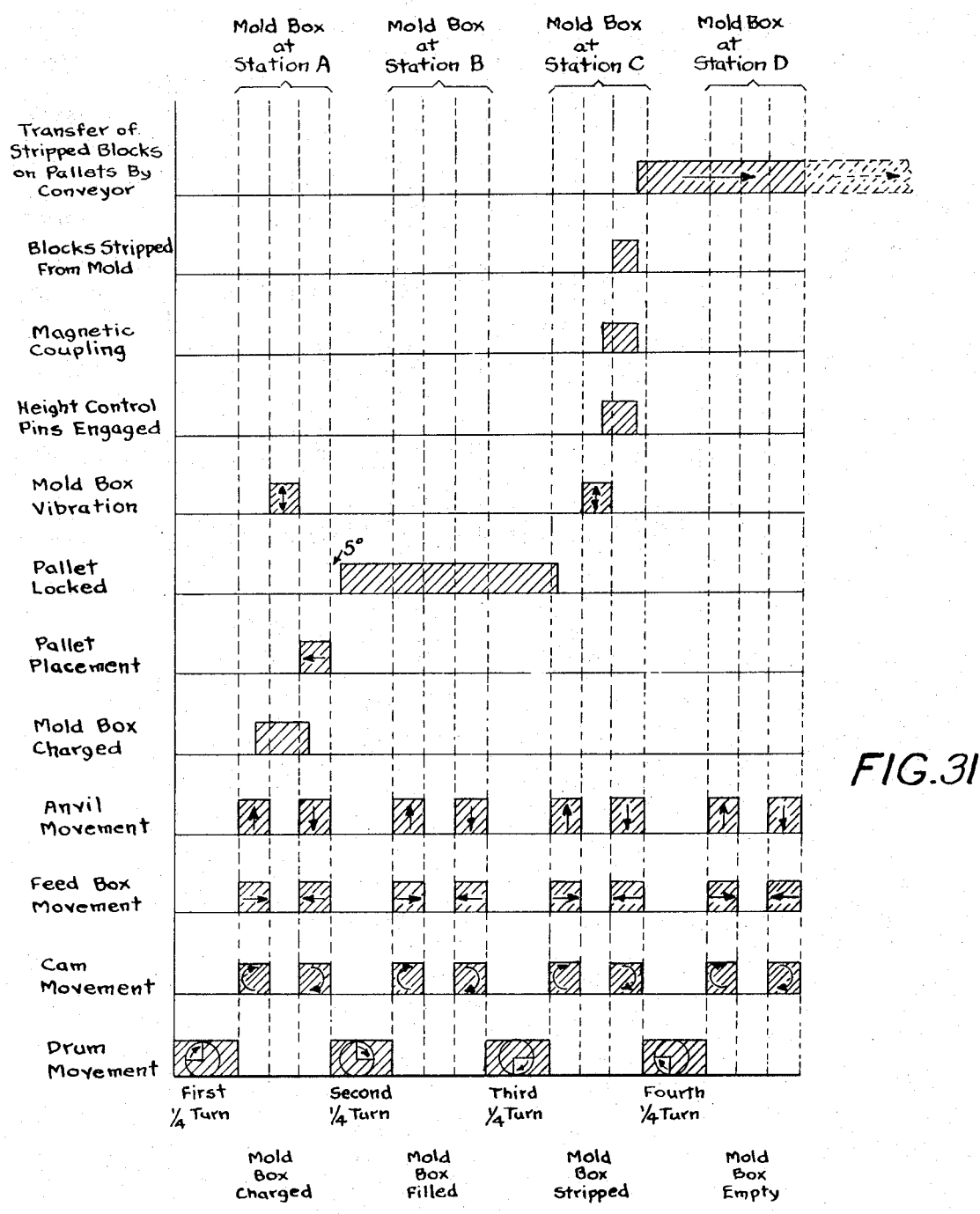

FIGS. 25 to 30 inclusive, are perspective views of various forms and constructions of concrete units which may be molded by the machine of the present invention; and FIGS. 31 and 32 are charts which respectively show the sequence of operations of the machine in respect to a single mold box as it moves from station to station upon a complete revolution of the drum and the sequence of operations of the machine upon all of the mold boxes carried by the drum for each quarter turn of the drum.

The concrete block forming machine of the present invention basically includes a revoluble drum having mounted within its interior for rotation about a horizontal axis a plurality of mold boxes which are uniformly spaced circumferentially about the axis of rotation of the drum, for movement successively from a station located at the top of the drum at which a mold box is charged with concrete to a station located at the bottom of the drum at which the mold box is stripped of the concrete block formed therein. In the machine as herein shown and described the mold boxes are four in number and so are spaced ninety degrees apart, with each box moving through an arc of 180 degrees from the mold charging station to the block stripping station.

The several mold boxes are supported interiorly of the drum upon a frame structure generally in the form of a cross in vertical section, the opposite ends of each intersecting section of said frame structure having mounted thereon a mold box disposed with its concrete filling end presenting outwardly of the frame structure. Each of said mold boxes is interiorly fitted with block stripping means which, when the mold is in position to receive a charge of concrete serves as the base wall of the mold box to limit the depth of the block formed therein, and, when the same mold box is in position to be stripped of the concrete block formed therein, serves to push the block out of its mold box. Since the block is stripped from the mold box after the latter has traversed an arc of 180 degrees and thus is reversed end for end from its position during the charging thereof with concrete, the block stripper means eventually overlie what may be considered the top surfaces of the formed blocks and thus by varying the contour of the concrete engaging surfaces of the stripper means, blocks having tops of various contours and shapes may be obtained.

In addition to the revoluble drum with its interiorly mounted mold boxes, the machine includes in the base thereof operating mechanism for effecting rotation of the drum and thus successive positionment of the several mold boxes at the concrete charging station, which operating mechanism also includes means for effecting vibration of each of the mold boxes during the interval of time that it is being charged with concrete as well as during an interval just prior to its being stripped of the block formed therein.

The machine further includes at its top end mechanism for successively charging each of the several mold boxes with its full complement of concrete as well as mechanism for delivering to each mold box a pallet which is adopted to close off the open end of the mold box through which the concrete was introduced into the box to confine the same therein during movement of the concrete-charged box to its station where the mold box is stripped of the formed block.

The pallet delivery mechanism is operative to successively feed pallets from a stacked pile thereof onto the filling end of each mold box when the latter is filled with its charge of concrete, each of which pallets, when placed in position in covering relation to the charge of concrete in the mold box, being held in the same position relatively to the concrete charge in the mold box during the final stripping of the concrete block from the mold box, thereby serving as a means for supporting the formed block during transfer thereof from the block-forming machine to the curing kiln or any other place of storage of the blocks.

Thus, the machine of the present invention comprises the following listed mechanism which are operative in predetermined timed sequence to automatically produce a succession of blocks of various shapes and forms as determined by the form of the mold box cavities:

(1) The rotating drum with its circumferentially spaced plural number of mold boxes each fitted with its own stripper head for stripping the formed block or blocks from the mold box upon completion of the block-forming cycle;

(2) The concrete charging mechanism for charging the several mold boxes successively with the concrete mix in the amount required for producing the formed units;

(3) The mechanism associated with the mold box charging mechanism for successively delivering to the charged mold boxes at the charging station pallets which serve, first to close the filling end of the mold box to hold the charge of the concrete mix therein as the box rotates through 180 degrees to the discharge station and, second, as the support for the discharged blocks or blocks from their mold box and for transfer of the formed blocks away from the block-forming machine;

(4) The mechanism for effecting vibration of those two of the mold boxes which are disposed 180 degrees apart and are respectively located at the mold charging and stripping stations of the machine during the interval of time that the mold is being filled with the concrete mix;

(5) The mechanism for determining and establishing a predetermined height (or depth) of the block to be formed in the mold box and obtaining for the formed block a desired degree of density or compactness;

(6) The mechanism for stripping the formed blocks from the mold when the latter moves into the block-discharging station of the machine;

(7) The mechanism for locking a pallet across the filling end of each mold box and holding it in such locked position until released at the block-discharging station where it serves as a support for transfer of the formed blocks away from the machine; and (8) The mechanism for transferring the block-loaded pallets from the machine.

(I) THE ROTARY DRUM CONSTRUCTION

Referring now to the drawings and more particularly to FIGS. 1 to 4, it will be observed that the rotary drum portions of the machine, designated generally by the reference numeral 10, is rotatably mounted upon a horizontally disposed main base or foundation 11 of generally rectangular outline made up of structural steel beams laid upon and secured to the floor. The floor itself, within the confines of the main base 11 is provided with a pit 12 for a purpose which will appear hereinafter.

Mounted upon the longitudinally extending side members of the main base 11 in longitudinally spaced alinement are two pairs of drum-supporting wheels 13—13 and 14—14. The frontal pair 13—13 of these wheels are commonly splined to a transversely extending shaft 15 suitably journalled in brackets 16—16 respectively secured to base frame side members, which shaft projects laterally beyond one side of the base 11 into a gear box 17 which houses a conventional electro-magnetically-operated clutch and brake assembly (not shown) operatively connected to an electric motor 18 for driving and braking the shaft 15, the wheels 13—13 keyed thereto and the drum 10 frictionally engaged by said wheels.

The clutch and brake assembly is of the type having a flywheel adapted to be continuously driven by the motor 18 in axially spaced relation to a stationary brake disc with an axially shiftable clutch plate disposed between the flywheel and the brake disc, which clutch plate is geared or otherwise connected to the shaft 15 to drive said shaft and through it the drum 10 at the desired speed. When the clutch plate is shifted into frictional engagement with the flywheel, as by electrical energization of the electro-magnet, the flywheel operates to drive the shaft 15, while when the clutch plate is shifted into frictional engagement with the brake disc, as by de-energization of the electro-magnet, rotation of the shaft 15 is interrupted.

The rear pair of wheels 14—14 are respectively journalled as idlers for free rotation in suitable brackets 19—19 also mounted upon the side members of the base 11 and together with the driven front wheels 13—13 provide a four-point supporting system for the drum 10. All of the wheels 13—13 and 14—14 are flanged upon their outer sides like the flanged wheels of a railway vehicle and preferably are surfaced with hard rubber or other suitable friction material to provide non-slip engagement between the wheels and the drum 10 rotatably supported thereon. The positively driven wheels 13—13 in engagement with the drum supported thereon afford a frictional drive for and effect rotation of the drum about its central horizontally extending axis.

The drum 10 comprises a pair of annular discs 20—20 having inwardly projecting flanges 21—21 welded or otherwise secured to the circular edges of the discs. The latter are rigidly secured together at circumferentially spaced intervals by transversely extending cross-braces or ties 22. The over-all diameter and width of the drum 10 are such that when it is disposed upon its two pairs of supporting wheels 13—13 and 14—14, it is free to rotate about its central axis while confined against lateral displacement relatively to the base frame 11 by engagement of the wheel flanges against the outer side edges of the circular flanges 21—21 of the drum. It will be noted that these drum flanges 21—21 are laterally spaced apart to provide the drum throughout its circumferential extent with substantial clearance cross-wise between the inner circumferential edges of the circular flanges 21—21 and more clearance between the annular side wall discs 20—20 of the drum. In addition to the drum being peripherally open centrally between its opposite side wall parts, its opposite sides are also each open for access to the interior of the drum by way of the large central openings in the drum side wall discs 20—20.

Although it is not intended to limit the machine to any particular dimensions for the drum, or to the number of 180 degrees related mold boxes operatively mounted in the drum or to the shape or number of blocks which may be produced per mold box, it may be stated, by way of example, that with a drum of about 12 foot diameter and an overall width of seven feet, the drum may conveniently mount four mold boxes spaced 90 degrees apart each of a size capable of being divided into 18 cavities for simultaneously producing 18 blocks ranging in depth from 2 inches to 12 inches in each such mold for each operating cycle or quarter turn of the drum. Assuming the machine to be a 4-mold machine in continuous operation at the rate of two and one-half cycles per minute or 150 quarter turn cycles per hour and assuming further that each mold box was an eighteen-cavity mold, the machine would have a production capacity of 2700 blocks per hour.

(II) THE MOLD BOX CRUCIFORM SUPPORTING STRUCTURE

The drum 10 is interiorly fitted with the supporting structure for a plurality of mold boxes so uniformly spaced about the periphery of the drum as to simultaneously present at least one mold box at the top of the drum with its open or concrete filling end presenting upwardly and a second mold box at the bottom of the drum with its open end presenting downwardly. In the apparatus as shown, the drum is fitted with four mold boxes 23 spaced 90 degrees apart so that upon rotation of the drum two of these mold boxes spaced 180 degrees apart are successively positioned respectively at a concrete loading station located immediately adjacent the top end of the drum and at a mold stripping station located immediately adjacent the bottom end of the drum.

Figure 8:
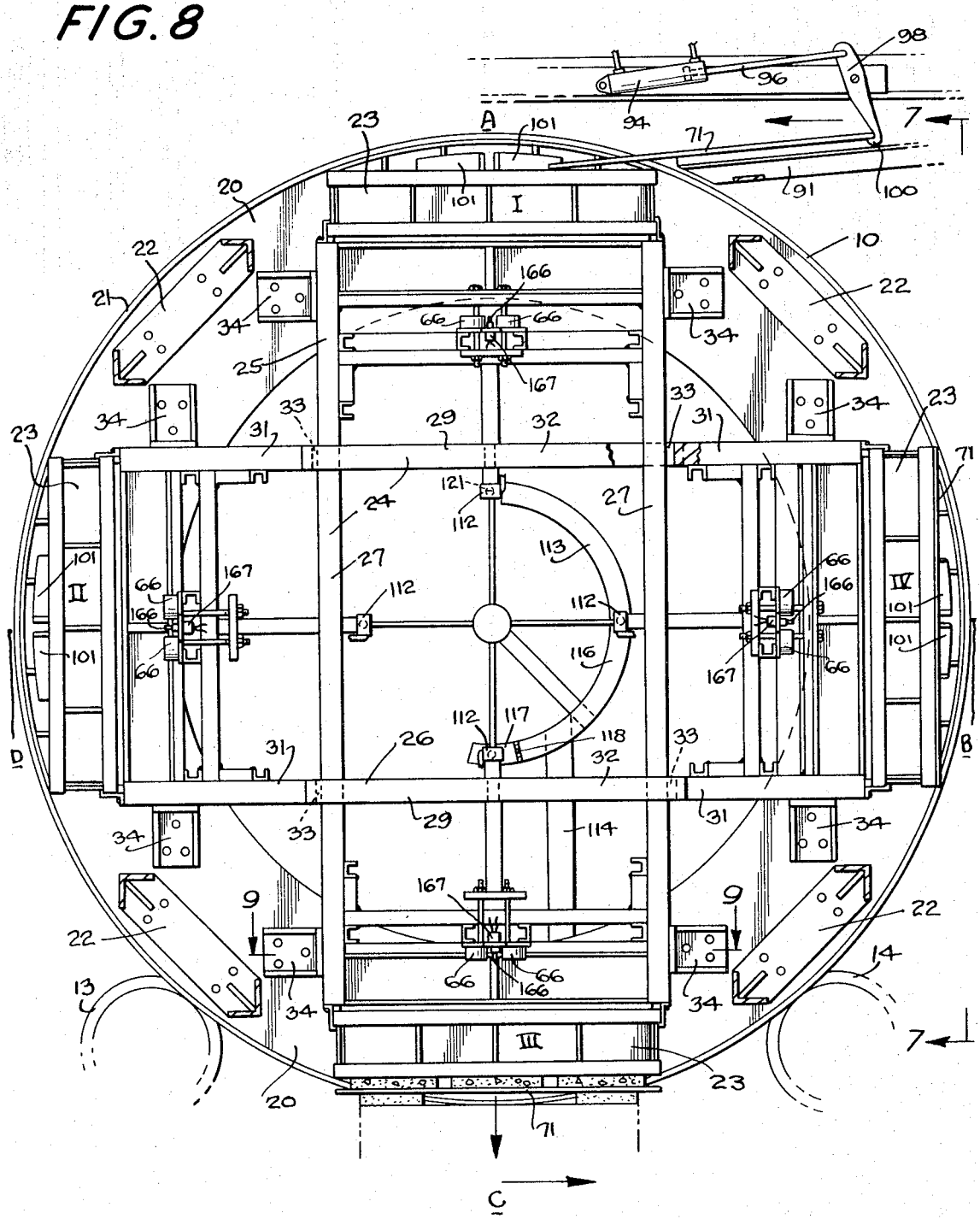
FIG. 8 is a vertical sectional view of the drum portion of the machine as taken along the line 8—8 of FIG. 7.

The several circumferentially spaced mold boxes 23 are supported by a frame structure generally designated 24, as see FIGS. 8 and 12. The mold box supporting frame structure 24 is generally of cruciform shape having two main sections 25 and 26 extending orthogonally with respect to one another. Each of these sections 25 and 26 is in the form of an open box-like frame formed of structural steel members suitably welded or otherwise secured together to provide a rigid structure. Thus, the mold supporting section 25 is formed of four elongated main corner bars 27 having their corresponding ends suitably interconnected by channel-shaped end rails 28 welded or otherwise secured to the corner bars, the several end rails being backed up by reinforcing bars 28a immediately adjoining each end rail 28, so that the section 25 is in the form of a rigid self-sustaining unitary assembly.

The second section 26 extending cross-wise of the section 25, while generally similar to the construction of section 25, differs therefrom in that its four corner bars 29 are each sectionalized to provide passages 30 through which the corners bars 27 of the section 25 freely project and thereby allow rectilinear vibratory movement of the mold supporting sections 25 and 26 relatively to one another. Preferably, these passages 30 in the corner bars 29 of the mold supporting section 26 for passage therethrough of the corner bars 27 of the mold supporting section 26 are formed, as best shown in FIG. 12, by separating the corner bars 29 into two opposite end portions 31—31 and interconnecting the same by an intermediate pair of transversely spaced parallel members 32—32. As in the case of the section 25, the corresponding ends of the four corner bars 29 of the section 26 are rigidly interconnected by suitably reinforced channel-shaped end rails similar to the end rails 28 of the section 25. It will be understood that other arrangements may be provided to permit of limited rectilinear movement of the unitary sections 25–26 relatively to one another.

The relative movement between the mold box supporting sections is merely that necessary to allow for vertical reciprocatory movement of a given mold box supporting section only when it is in a position wherein the vertical center line of the mold box is coincident with the vertical diametrical line of the drum extending between the loading station at the top and the block discharge station at the bottom of the machine.

This vertical reciprocation of each mold supporting section only when it is in its vertical position is that required for vibrating not only that mold at the loading station which is being filled with concrete but also the previously filled mold at the loading station of the machine just prior to the stripping of the formed blocks from the latter mold, the vibration being for the purpose of properly packing and densifying the concrete charge in the mold.

In this connection, it will be noted that when the drum is in such position that the mold supporting section 26 thereof is vertically disposed, said section is floatingly supported in relation to and is free to vibrate vertically with respect to the then horizontally disposed mold supporting section 25. Upon rotation of the drum 90 degrees clockwise of its position shown in FIG. 8, the section 25 is then vertically disposed and may be vertically vibrated relatively to the then horizontally disposed section 26, to which end the passages 30 afford sufficient clearances at the opposite ends thereof, as at 33, for the requisite movement of the mold supporting section 25 relatively to the section 26.

The cruciform mold box supporting structure 24 is guided for rectilinear shifting movement within the drum 10 by suitable paired guide members 34—34 bolted or otherwise secured to the inner surfaces of the sidewall annular discs 20—20 of the drum. These guide members are each provided with right angularly related flanges 35, as see FIG. 9, which engage the flat surfaces of the corner bars 27 of the mold box supporting section 25 and the corner bars 29 of the mold box supporting section 26. Four pairs of such guides are secured to each side wall disc of the drum to provide laterally spaced pairs of guides adjacent the opposite end portions of each of the orthogonally related sections of the cruciform mold box supporting structure 24, whereby said sections are respectively shiftable only diametrically of the drum along lines which intersect one another at right angles.

(III) THE MOLD BOX CONSTRUCTION

The mold boxes 23 are respectively secured to each outer end of the cruciform supporting structure 24, as see FIG. 8 wherein four such mold boxes are shown spaced 90 degrees apart. While these mold boxes may be of any suitable desired construction, they are preferably of the construction shown in FIGS. 14 to 19.

Basically, each mold box 23 consists of an open-ended box-like structure having its inner end defined by a set of rails 36 and its outer end defined by a set of rails 37, the two sets of rails being spaced apart in parallel relation to detachably support therebetween a set of panels 38 which form the side walls of the mold box. The outer rails 37 have their connecting ends secured together by bolts 39 and are secured in suitably spaced parallel relation to the inner rails 36 by interconnecting tie rods 40. The rails 36 and 37 are respectively provided with opposed V-shaped grooves 41 and 42 for receiving therein complementally shaped opposite edge portions of the mold box side wall panels 38, the latter being thus detachably secured in position between the inner and outer sets of the rails 36 and 37 by what may be termed tongue and groove joints.

Figure 15:
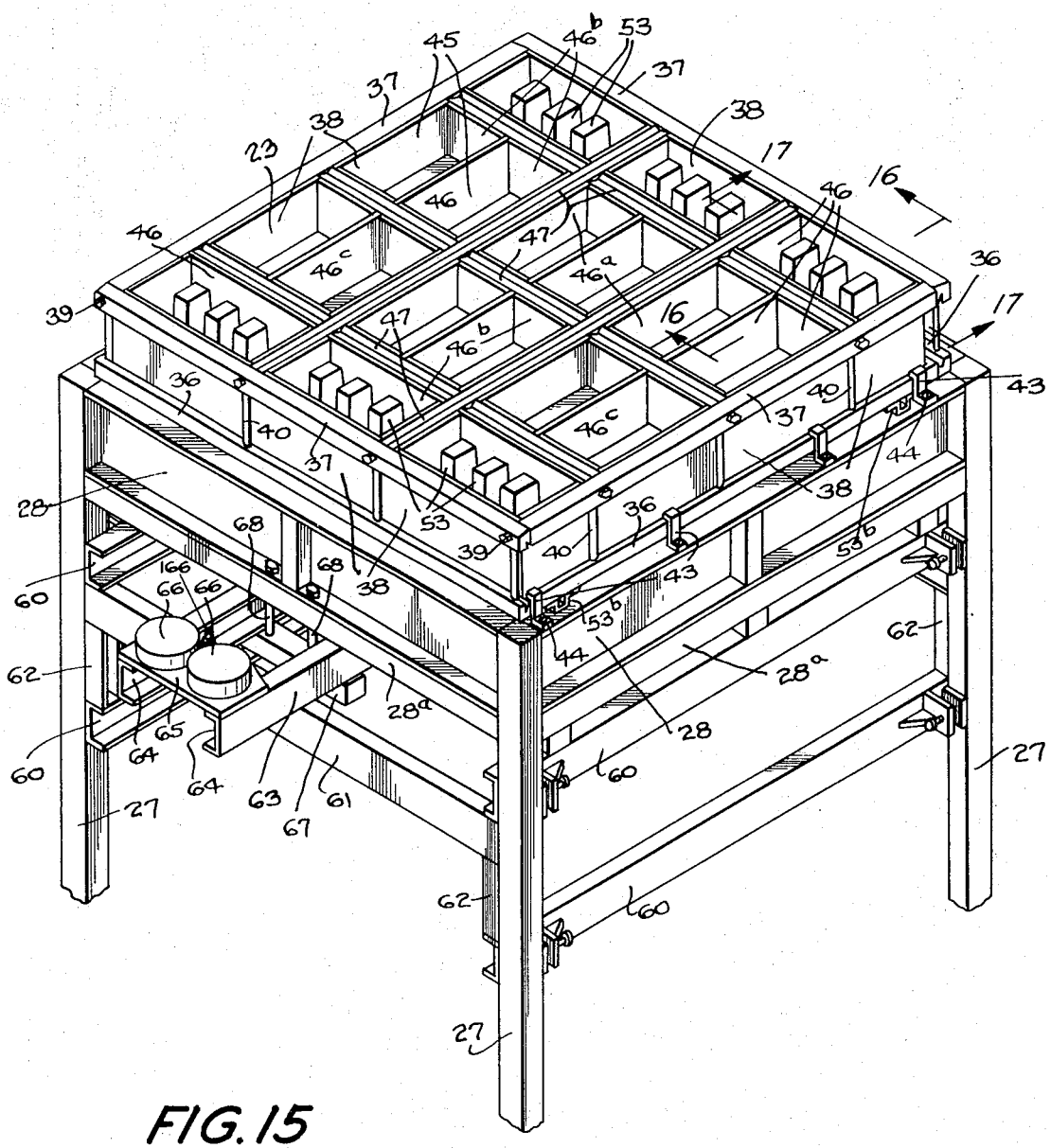
FIG. 15 is a perspective view showing one of four mold boxes and its associated stripper shoe mounted upon the supporting frame shown in FIG. 12, the mold box being shown in position at the filling station of the machine at the top thereof in condition to receive a charge of concrete.

The mold boxes 23 as thus formed are each rigidly secured to an end of the cruciform supporting structure 24 by Z-shaped clamps 43 which are bolted, as at 44, to opposite end rails 28 of the supporting cruciform structure 24 and hook over the superposed side rails 36 of the mold box frame, as most clearly appears in FIG. 15.

The mold boxes 23 may be of single cavity form to produce large slab-like blocks of concrete, one in each mold box or they may be of multiple cavity form to simultaneously produce in each mold box a plurality of concrete blocks of the same or different shapes corresponding to the mold cavities.

Figure 16:
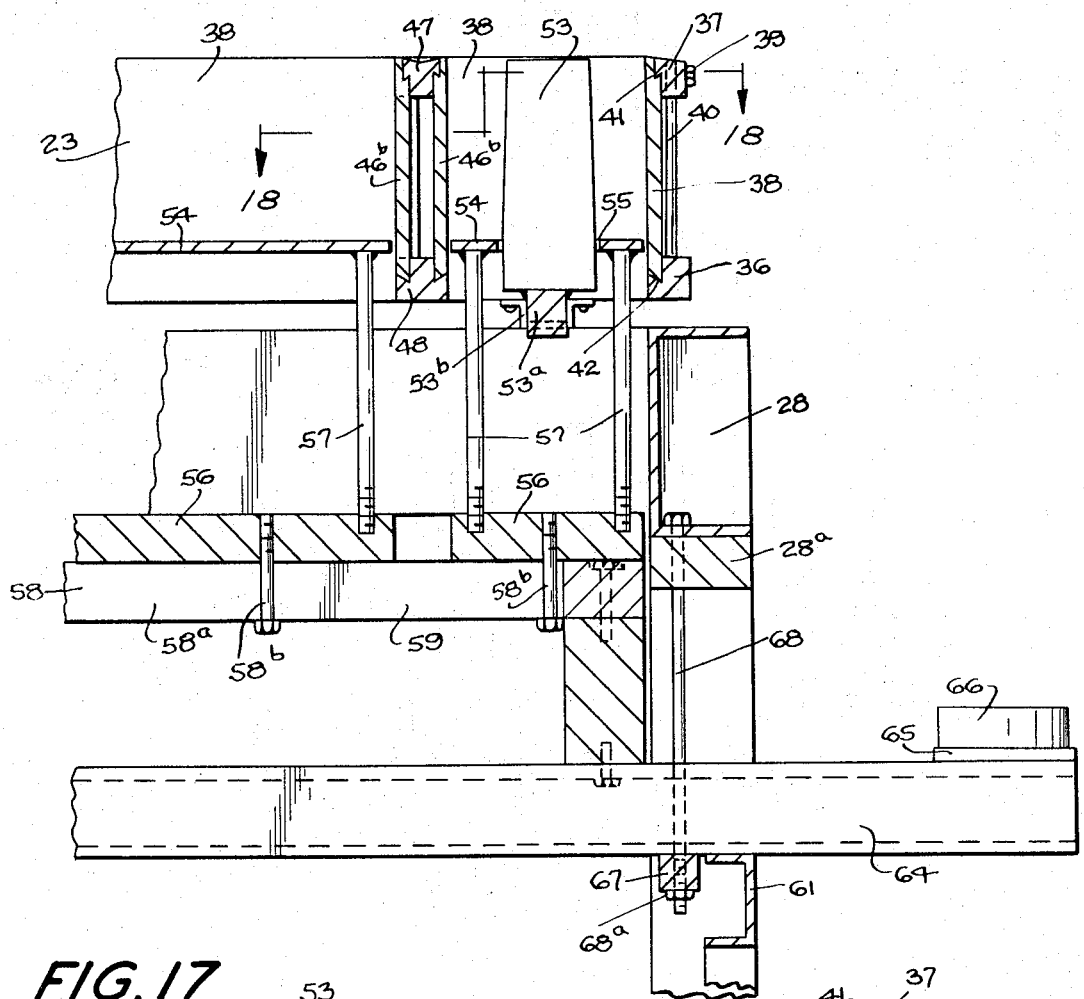
FIG. 16 is a sectional view as taken along the line 16—16 of FIG. 15.
Figure 17:
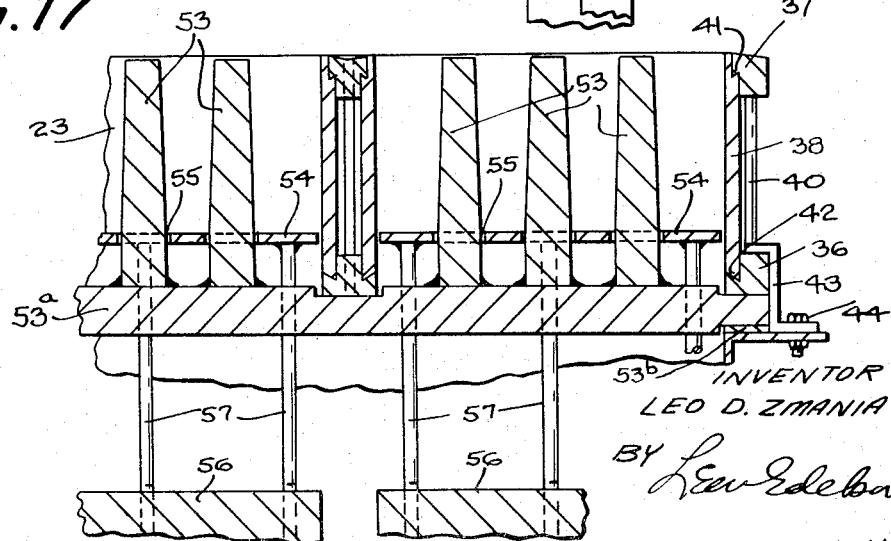
FIG. 17 is a sectional view as taken along the line 17—17 of FIG. 15.

FIG. 15 illustrates a multiple cavity mold box designed to produce 18 concrete blocks at one time, six of which may be in the form of hollow blocks. The several cavities 45 of the mold box as shown in this FIG. 15 are formed by interiorly providing the box with partitioning wall members 46 detachably secured together in interlocking tongue and groove jointed relation by means of a set of intersecting rails 47 extending across the outer end of the box and a second set of corresponding intersecting rails 48 extending across the inner end of the box. The outer set of rails 47 which are bolted to the outer perimetral rails of the box, as by the bolts 49, are each oppositely grooved, as at 50—50. The inner set of rails 48 are also each oppositely grooved, as at 51—51, for registry with the grooves 50—50 of its oppositely disposed rail 47, the arrangement being such that each registering pair of the oppositely presenting grooves 50 and 51 receive therein complementally shaped end portions of the internal partitioning wall members 46, such as those designated 46a and 46b. The latter wall members may be split, as at 52, to secure in place the intermediate wall members 46c (see FIG. 18).

Where hollow blocks are to be produced, the mold cavities for forming the same may be provided with cores 53, which are mounted upon a rail 53a extending across the inner end of the mold box and having its opposite ends fixedly seated in brackets 53b bolted to the mold box inner side rails 36—36, as see FIGS. 15, 16 and 17. These cores 53 are tapered and disposed with their reduced ends projecting toward the outer end of the mold cavity in which they are provided.

Each mold box 23 is provided with one or more block stripping shoes 54, one shoe for each cavity of the mold. These stripper shoes 54 are respectively the form of flat plates of perimetral outlines conforming to the internal shapes of the mold cavities in which they are fitted, sufficient clearance being provided between the marginal edges of the stripper shoes and the internal wall surfaces of the mold cavities to permit free movement of the shoes toward the outer open ends of said cavities for effecting discharge of the formed blocks. In their innermost position of the stripper shoes 54 in their respective mold cavities, as shown for example in FIGS. 16 and 17, the shoes constitute the bottom wall or base of the mold cavity to be filled with the concrete mix and so determine the depth of the block formed in the mold. Where the mold cavity is provided with internal cores 53 for forming hollow blocks, the stripper shoe 54 associated with such mold cavity is apertured, as at 55, for projection therethrough of the core element, one such aperture being provided for each core element in a given mold cavity.

(IV) THE STRIPPER SHOE ASSEMBLY

As appears also most clearly in FIGS. 16 and 17, the stripper shoe or shoes of each mold box 23 are connected to stripper heads 56 by means of rods 57, which heads 56 are in turn supported upon a slatted bed 58 rigidly mounted upon and secured to an underlying supporting structure designated generally by the reference numeral 59 (as see FIG. 14). This underlying structure 59 includes on each of its two opposite sides a pair of spaced, parallel rails 60—60 having their corresponding opposite ends interconnected by transversely extending rails 61—61 and struts 62—62 to provide substantial spacing between the rails 60—60 on each side of the supporting structure 59. The stripper heads 56 may be secured in adjusted position lengthwise of the slots 58a of the slatted bed 58 by bolts 59b which project upwardly through the slots 58a into the bottom of the stripper heads as is best shown in FIGS. 9 and 16.

Disposed between the slatted bed 58 and the cross rails 61—61 of each stripper head supporting structure 59 is a beam assembly 63 comprising a pair of laterally spaced channel-shaped rails 64—64 having their corresponding ends connected by a plate 65 to which are rigidly secured a pair of steel circular pads 66—66. The beam assembly 63 is of a length such that the pads 66—66 at each opposite end thereof are spaced outboard of the supporting structure for the mold box with which these pads are associated, one pair of such pads being thus provided at each opposite side of each mold box 23 with the pads of each pair spaced equidistantly to either side of the mold box transverse center line. It will be noted further, as most clearly appears in FIG. 7, that when the mold boxes and their associated stripper head assemblies are mounted upon the cruciform supporting structure within the drum 10, the oppositely disposed pads 66—66 for each mold box are respectively disposed externally of the drum side walls.

The above described mold box stripper shoes 54, their associated stripper heads 56, the slatted bed 58 and its underlying supporting structure 59 together with the beam assembly 63 carrying the steel pads 66—66 at each end thereof, are all rigidly secured together as a unitary assembly which is movable relatively to the mold box 23 with which it is associated. Movement of this assembly relative to its associated mold box is required, of course, first, to locate the stripper shoes in proper position within the mold cavities to form the bottom wall thereof during the operation of charging the mold with the concrete mix at the loading station, and, second, to push the formed blocks out of the mold at the block discharging station.

Each unitary stripper assembly just mentioned is supported in its predetermined proper position relatively to its associated mold box by a pair of saddle bars 67—67 respectively extending cross-wise of the beam assembly at opposite ends thereof. These saddle bars are adjustably held in fixed position by headed rods 68—68 suspended from the end rails of that section of the main cruciform structure in which the stripper assembly is mounted and extending through the saddle bar. Nuts 68a threaded upon these rods 68—68 (as see FIG. 16) afford means for limited positional adjustment of the saddle bars 67 and hence of the stripper shoe and head assembly relatively to the mold box associated with said assembly. Thus, by adjustment of the nuts 68a on their saddle bar supporting rods 67—67, the stripper shoes in the mold box cavities may be adjusted toward or away from the concrete filling ends thereof to vary the depth of the mold cavities and so vary the depth of the blocks formed therein.

This adjustment for height or depth of the formed blocks may also be effected by fitting the mold box with interchangeable stripper shoe assemblies in which the supporting rods 57 for the stripper shoes 54 are of the different lengths required for location of the latter at the desired levels in the mold cavity for production of blocks of the predeterminedly desired depth.

Since the stripper assembly is shiftable relatively to its associated mold box, means are provided for insuring rectilinear movement of each such assembly within the main cruciform structure in which it is mounted. This means consists of a pair of laterally spaced guides 69—69 rigidly secured, as by welding, to each of the side rails 60—60 on opposite sides of the stripper head supporting structure 59. These guides 69—69 are of the construction shown in the detail of FIG. 13, each being provided with an adjustable wear pad 70 which bears flatwise against the flat surface of corner bar of the main cruciform supporting structure. Thus, the stripper assembly for each mold box 23 is guided for movement lengthwise of that section of the main mold box supporting structure upon which the mold boxes are mounted by four pairs of guides for each mold box stripper assembly, there being two such guides 69 at each corner of said assembly spaced longitudinally along the length of the main corner bars. As previously described, these corner bars are themselves supported for limited movement diametrically of their supporting drum by the guides 34 as shown in FIG. 8.

It will be apparent that as the drum revolves about its central horizontal axis, the several mold boxes 23 will be successively angularly shifted through four stations respectively designated A, B, C and D in FIG. 1. Each mold box is charged wih its full complement of the concrete mix when it is at station A and is positioned with its open filling end presenting upwardly. When filled with the concrete mix, this open end of the mold is closed off by a pallet plate 71 which remains in position on the mold box as it moves clockwise through station B and into block-discharging position at station C. In this last-mentioned position of the mold box it is, of course, reversed end for end from its at-rest position at charging station A, with the pallet plate 71 in position to support the formed block or blocks discharged or stripped from the mold. It will be apparent that the shape of the stripper shoe or shoes for a given mold determines the contour of the top surface of the molded block and that the pallet plate 71 on the mold forms the flat bottom surface of the block stripped from the mold box.

FIGS. 25 to 30 respectively show different shapes of blocks which may be produced in the machine simply by providing the mold box with cavities shaped to provide the desired final shape of the block, which may be hollow-cored as shown in FIG. 25 by use of core elements in the mold box as previously described, or solid as shown in FIG. 26. The relatively thin block, as shown in FIG. 27, simply requires setting of the stripper shoes well into the mold box to provide it with a shallow cavity, while the elongated block of FIG. 28 may be obtained through use of a cavity extending the full length of the mold box. The top surface of the block may be of convex shape, as shown in FIG. 28 or of the pyramidal shape, as shown in FIG. 30, obtained by fitting the mold box with complementally shaped stripper shoes. Even angularly shaped blocks, as shown in FIG. 29, may be formed by fitting the mold box with wall and core elements forming the requisite shape of the mold cavity. It will be apparent also that since the mold boxes are individually of large size, e.g. 54 x 52 inches, they may each be readily divided, as hereinbefore described, into multiple-cavity molds each capable of simultaneously producing a plurality of differently shaped concrete molded units. Further, the several mold boxes in a given machine may be up and employed to respectively produce differently shaped units, so that while one mold box is being filled with concrete mix to mold a certain shape of block, the mold box opposite that being filled may be discharging blocks of entirely different shape.

When a given mold box arrives at station B, it is disposed with its axis extending horizontally. However, in this position of the mold box, it is not subject to any vibration but instead holds its charged complement of the concrete mix in relatively quiescent state until it is again vibrated at the discharge station C just prior to stripping the formed blocks from the machine.

The mold box is of course completely empty when it leaves station C and moves through the station to the filling station A. As has been previously mentioned, when the machine is operating with four mold boxes spaced 90 degrees apart as shown, upon each quarter turn of the drum a load of formed blocks would be discharged from each mold box at station C. Of course, the drum could be fitted with only two mold boxes spaced 180 degrees apart, in which case each mold box would discharge a load of formed blocks upon each one-half turn of the drum.

(V) THE MOLD BOX CHARGING MECHANISM

As most clearly appears in FIGS. 1, 22 and 23, the mechanism for successively charging the mold boxes 23 with concrete mix is supported immediately above the top of the drum by suitably spaced vertical standards 72 having their top ends connected by a pair of horizontally extending, laterally spaced, parallel rails 73—73 respectively disposed substantially in the vertical planes of the drum side walls. Fixedly supported in position between these rails 73—73 to one side of the vertical diametric plane is an open-bottomed hopper 74 from which the prepared concrete mix is delivered to the several mold boxes of the machine. Spaced below the open bottom of the drum and supported in fixed relation to the drum by the standards 72 is a horizontally disposed apron 75, which apron is substantially coplanar with the top end of the mold box positioned at the loading station for receiving its charge of the concrete mix when the feed box is in its fully retracted position.

The rails 73—73 are each of angular section and serve as guide tracks for shiftably supporting thereon a feed box or drawer 76 having a pair of laterally spaced side wall plates 77—77 each having a pair of longitudinally spaced rollers 78—78 suitably journalled thereon, which rollers support the feed box as it moves back and forth along its guide tracks. The outer portion of the feed box is provided with a bottom plate 79 having a downturned flange 80 at its forward end which serves upon each forward stroke of the feed box to push the concrete mix deposited from the hopper 74 onto the apron plate 75 toward and into the mold box located at the charging station A, simultaneously to the plate 79 cuts off the supply of concrete from the hopper 74.

The forward end of the feed box is provided with a transversely extending front wall 81 spaced forwardly of the concrete pusher flange 80 a distance such that when the feed drawer is shifted into mold filling position, i.e., to the right as viewed in FIG. 1, the wall 81 is in substantial vertical registry with the top edge of the right hand side wall of the mold box. The front wall 81, conjointly with the apron flange 80 and the opposite side wall plates 77—77 of the feed box define an opening 81a which registers with the open bottom of the hopper when the feed box is in its fully retracted position and allows a mold box charge of concrete to be deposited upon the apron 75 for delivery to and into the mold box upon the forward stroke of the feed box.

The fore and aft motion of the feed box 76 is effected through rack and pinion means operated by an electric-circuit-controlled reversible electric motor 82, suitably mounted upon the fixed support for the shiftable feed box. The requisite interruption in operation of the motor 82 and simultaneous conditioning thereof for reverse operation upon completion of each fore and aft stroke of the feed drawer is effected by suitable switches actuated by the feed drawer automatically as it reaches the limit of its movement in either direction. As shown in FIGS. 1 and 23, a pinion 83 keyed to the motor shaft engages a toothed rack 84 suitably mounted upon the underside of the feed box. Preferably, the rack 84 is spaced below the feed box to provide clearance for a hold-down roller 85 supported by the upper ends of a pair of straps 86—86 (see FIG. 23) extending between the roller shaft and the pinion shaft, which hold-down roller 85 insures constant engagement of the rack with its pinion during fore and aft travel of the feed box.

The bottom end of the opening 81a in the forward portion of the feed is substantially coplanar with the upper end of the mold box to be filled with concrete mix, and thus it will be apparent that upon retraction of the feed box after having deposited a charge of concrete in the mold box, the bottom edge 87 of the front wall 81 serves to strike-off and remove excess concrete from above the top of the mold box 23 and thereby level off the top surface of the concrete charge in the mold.

(VI) THE MECHANISM FOR DELIVERING PALLETS TO THE CHARGED MOLD BOXES

This pallet supplying mechanism, as best shown in FIGS. 1, 21 and 24, is also mounted upon the supporting structure for the mold box charging mechanism just described and includes at the side of the drum opposite that with which the charging mechanism is associated a pallet magazine essentially comprising a pair of laterally spaced endless chains 88—88 each trained over a pair of longitudinally spaced sprockets 89—89 suitably journalled for rotation between supports 90—90 secured in cantilever fashion to the upright standards 72. The chains 88—88 are each spaced inwardly of their side supports sufficiently to conjointly support upon their upper runs a stack of the pallets 71 hereinbefore mentioned, each of which pallets is of a size and shape to completely cover the upper end of the mold box when positioned upright at the concrete loading station A. Any suitable means, such as the electric motor 90A connected to the outermost sprocket shaft through a gear box 90B as shown in FIG. 21, may be provided for operating the chain conveyor pallet delivery mechanism.

A pair of fixed rails 91—91 extend between the pallet discharge end of the conveyor chains 38—38 and the proximate top edge of the mold box, these rails 91—91 and the upper runs of the chains being disposed in a common plane inclined with respect to the horizontal at an angle of approximately 5 degrees to favor successive movement of the pallets toward the top of the mold box to be closed by a pallet.

Extending across the pallet discharge end of the conveyor chains 88 is a transversely extending vertical gate or barrier plate 92 having its bottom edge spaced above the top runs of the chains just sufficiently to permit the chains to shift the bottom-most pallet of the stack through the space 93 beneath the gate plate onto the fixed rails 91—91. In order to effect this one-at-a-time delivery of the pallets from the stack thereof, the conveyor chains 88—88 are provided with 180 degrees spaced pallet-pusher elements 93a each of a height sufficient to engage the outer edge of the lower-most pallet of the stack and push it into position onto the rails 91—91 free of the conveyor chains.

Extending forwardly of the feed box 76 for horizontal reciprocal movement therewith along the top rails 73—73 is a fluid-pressure cylinder 94, pivoted as at 95 to a frontal extension of the feed box side wall 77, which cylinder is provided with a piston rod 96, pivotally connected, as at 97, to a lever arm 98, which latter is in turn pivoted, as at 99, for oscillatory movement centrally between the rails 91—91. This lever arm 98 is provided with a hook-shaped free extremity 100 adapted to engage over the rear edge of the pallet 71 when it is fully positioned upon the rails 91—91 (as shown in FIG. 1).

In the condition of the machine as shown in FIG. 1 with the feed drawer 76 fully retracted, the piston rod 96 of the fluid pressure cylinder 94 is fully extended to hold the lever arm 98 in its more or less upright position in engagement with the pallet 71 overlying the filled-with-concrete mix mold box. This positional relation between the lever arm 98 and the pallet 71 is established by the supply of fluid under pressure to the cylinder 94 automatically as the feed drawer moves into mold filling position and continues during the return of the feed drawer to its fully retracted position, during which return movement of the feed drawer the forward edge of the pallet engaged by the hooked end of the lever arm 98 scrapes across the top of the mold box to further remove whatever excess concrete mix was not removed by the bottom edge 87 of the front wall or strikeoff plate 80 of the feed drawer.

When the pallet 71 is fully positioned over the filling end of the mold box 23 at the charging station, the lever arm 98 is disengaged from the rear edge of the pallet by retraction of the piston rod 96 through altered flow of the pressure fluid to the operating cylinder 94, thus causing the hooked end of the lever to be raised sufficiently to permit travel of the lever over the next pallet to be delivered to the charging station, which travel occurs simultaneously as the feed drawer shifts into position to charge the mold box to be closed by said next engaged pallet. Thus, the fluid-pressure operated lever arm 98 operates in timed relation to the operation of the pallet feeding mechanism and the feed drawer to shift a pallet 71 to and over the top end of each mold box at the charging station when said mold box is completely filled with its complement of the concrete mix.

Any suitable means (not shown) may be employed for synchronously operating the feed drawer and the pallet delivering mechanism in timed relation to the operation of the drum for successively positioning the several mold boxes at the charging station.

(VII) THE PALLET LOCKING AND RELEASING MECHANISM

It will be understood, of course, that when each mold box is filled with the concrete mix at the charging station A and its open end is closed by one of the pallets 71, the covering pallet is required to be firmly held in secured position during the 180 degree travel of the closed mold box to station C, at which latter station the pallet is released for movement away from the mold box as a support for the formed blocks stripped from the mold.

As most clearly appears in FIGS. 7 to 11, inclusive, the drum 10 is interiorly fitted at opposite sides of each mold box 23 with a pair of swingably mounted pallet grippers 101—101 each carried by a shaft 102 suitably journalled for oscillatory motion in a support 103 welded to or otherwise fixedly mounted upon each side of the drum in spaced relation to the proximate side wall of each mold box 23. Thus, a pair of these supports 103 respectively embrace the opposite sides of each mold box. Each such support extends chordally across that one of the laterally spaced circular flanges 21—21 of the drum with which it is immediately associated, and is rigidified by gusset plates 104.

Figure 5:
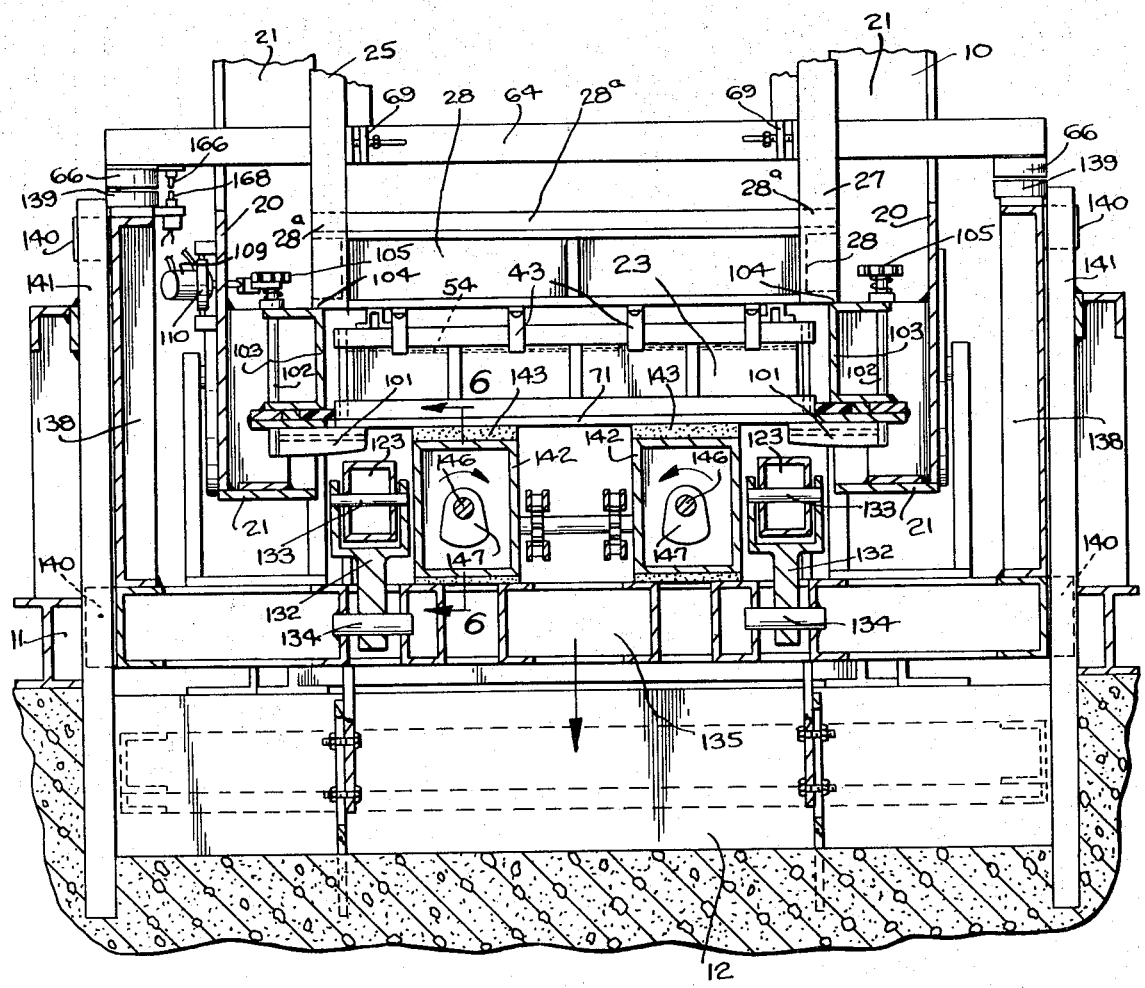
FIG. 5 is a transverse vertical sectional view as taken along the line 5—5 of FIG. 3, but showing the anvil assembly elevated only to the point at which it initially engages the block-supporting pallet of the mold box at the block-stripping station of the machine.
Figure 6:
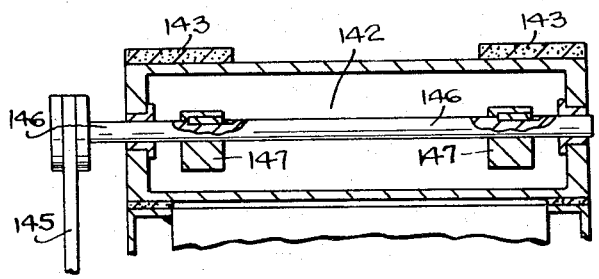
FIG. 6 is a sectional view of a portion of the machine as taken along the line 6—6 of FIG. 5.

It will be noted, as most clearly appears in FIGS. 5 and 9, that each pair of these supports 103—103 when positioned at the bottom of the drum, to wit, as when the mold box embraced therebetween is at the block stripping station, serves as fixed bottom rests for that section 25 or 26 of the mold box supporting frame 24 which is then vertically disposed. For this purpose, the chordal supports 103—103 are each of a width such that they respectively extend inwardly across the outside edges of the endmost side rails 28—28 of each cruciform section so that as each such section assumes an upright position between the concrete loading and block discharging stations of the machine, its bottom end rests upon and is supported by a pair of the chordal supports 103—103, as at 104 (FIG. 5).

The shaft 102—102 of each set of the pallet grippers 101—101 project in parallel relation through their support 103 and respectively have fixed to their free ends a pair of interengaged pinions 105—105. Keyed to one of the pinion shafts 102 is a link or lever 106 the free end of which is pivotally connected, as at 107, to the piston rod 108 of a double-acting fluid pressure cylinder 109, which is suitably supported upon the drum by a gimbal ring mount 110 which permits the axis of the cylinder 109 to incline freely in all directions as its piston rod is alternately extended and retracted.

It will be apparent that when the cylinder 109 is actuated to extend its piston rod 108 (see FIG. 11), the pinions 105—105 will be oppositely rotated as indicated by the arrows in FIG. 11 to cause the pallet grippers 101—101 to swing inwardly of the drum side wall into positions in which they closely overlie the exposed surface of the pallet 71 placed in closing position over the open end of the mold box. Coiled springs 111 embracing the projecting ends of each of the pinion shafts 102—102 serve to resiliently urge the pallet grippers into engagement with the pallet and allow for easy movement of the grippers out of pallet engaging position when the weight of the mold box and its supporting frame is transferred from the relatively fixed supports or rests 103—103 to the underlying anvil mechanism (to be presently described) for vibration of the mold box and subsequent withdrawal of the formed blocks from the mold at the block discharging station C.

As has been indicated above, each pallet is engaged at each of its opposite sides by a set of the pallet grippers, which latter are swung into or out of pallet gripping position depending upon the direction of flow of the pressure fluid to the fluid pressure motor provided for each set of the pallet grippers. The direction of flow of pressure fluid to the several pallet gripper actuating cylinders 109 is controlled by suitable two-way valves 112, one for each cylinder, which valves are in turn controlled by cam track 113, best shown in FIGS. 1, 7 and 8, over which they ride as the drum is rotated about its central axis. This cam track is of semi-circular shape fixedly supported in position externally of one side of the drum by a fixed upright or stanchion 114 (see FIG. 8). The several valves 112, suitably supported for rotation with the drum 10, are circumferentially spaced about a circle coincident with the arc of the cam track 113 and are respectively connected by suitable conduits (not shown) to the supply fittings 115—115 of the fluid pressure motors which operate the pallet grippers for the several mold boxes. Preferably, the valves 112 are commonly connected to a suitable source of fluid pressure for supplying the pressure fluid by way of each valve to one end or the other of the double-acting cylinder which is operatively associated with a particular mold box.

Figure 7:
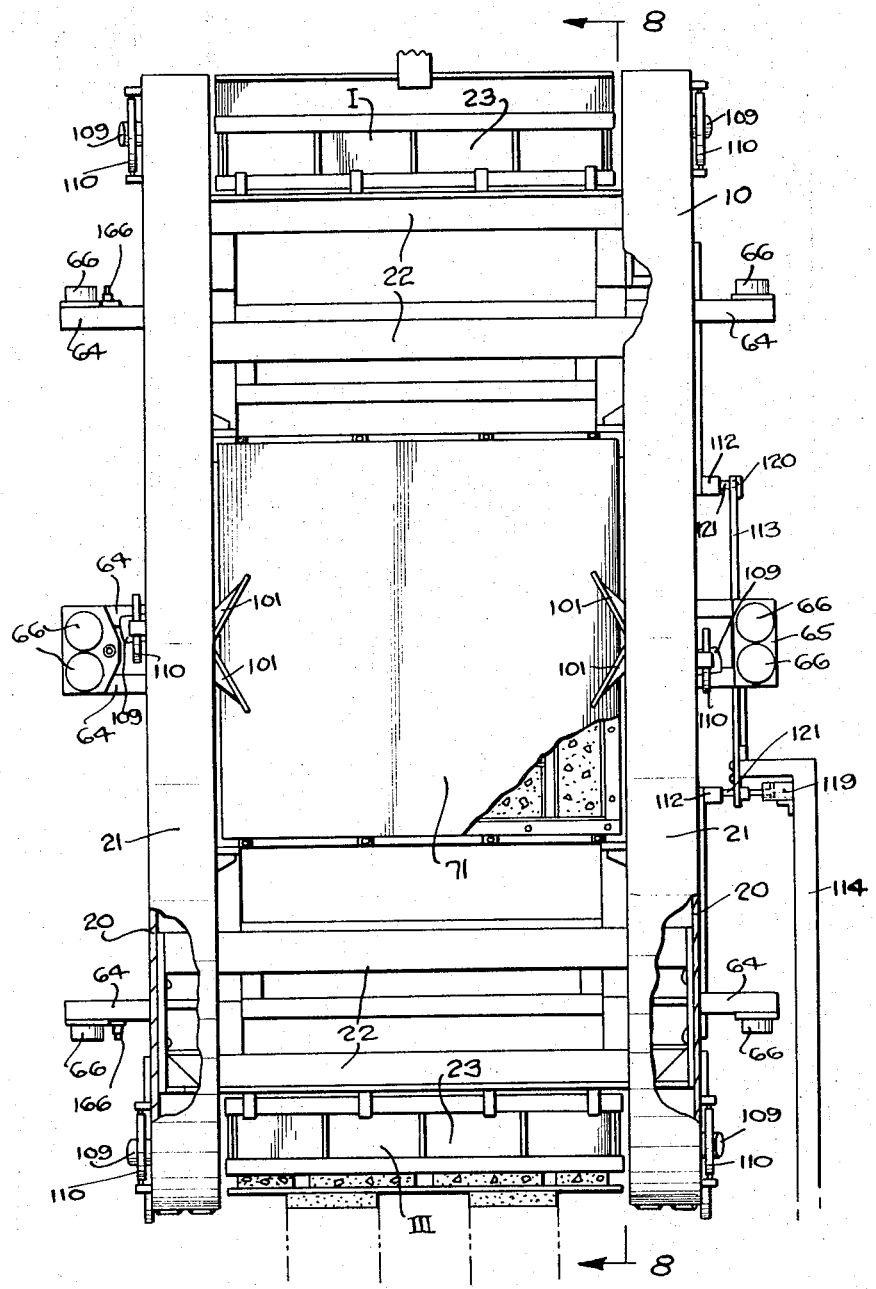
FIG. 7 is a front elevational view of the revoluble drum portion of the machine as seen from the line 7—7 of FIG. 8.

The cam track 113 which of course is held stationary during rotation of the drum is provided at the lower end of its main section 116 with a short section 117 hinged, as at 118, to permit it to be moved outwardly of the side of the drum and out of the plane of the fixed section of the cam track. As the several valves 112 successively engage and move along the cam track 113, they are each actuated to supply pressure fluid to the fluid pressure cylinders 109 for holding the pallet grippers in pallet securing position, as shown in FIGS. 7 and 11.

The hinged section 117 of the cam track 113 is adapted to be swung outwardly of the main section of the track by an electrically energized solenoid 119 (shown in FIG. 7), which is actuated just after the pallet 71 of the mold box at the block discharging station C has been engaged by the underlying anvil mechanism to be described hereinafter. So long as the vertically disposed mold boxes are supported upon the fixed rests 103—103, the hinged section 117 of the cam track is held coplanar with the main section thereof and the valve 112 in engagement with said hinged section of the cam track continues to supply pressure fluid to the actuating cylinder for the pallet grippers associated with the mold box at the discharge station A. However, when the load of the vertically disposed mold boxes (e.g. boxes I and III in FIGS. 5 and 8) has been transferred from the rests 103—103 to the underlying anvil support, upon energization of the solenoid 119, the hinged section of the cam track is swung outwardly so that the valve 112 associated with the mold box at the discharge station supplies pressure fluid to that cylinder 109 associated with said mold box for releasing the pallet grippers from their pallet holding position.

This release of the pallet grippers from holding engagement with the pallet occurs only when the mold box 23 closed by said pallet arrives at the block discharging station C and is in inverted position with its pallet underlying the mold box and resting on the supporting anvil as hereinafter described. The released pallet is then free to move downwardly away from its associated mold box, carrying with it the blocks as they are stripped from said mold box at the block discharge station C.

Normally, the pallet grippers 101-101 for the mold box at the loading station are actuated to lock the pallet 71 to said mold box just after the drum 10 commences its movement out of its loading position. To this end, it will be noted that the upper extremity of the cam track 113 is spaced approximately five degrees from the vertical center line of the machine as viewed in FIG. 8 and is outwardly turned as at 120 (see FIG. 7), to provide an inclined surface for movement of the valve 112 associated with the just-filled mold box onto the cam track. The two-way valves 112 are each preferably of a type having a spring-pressed stem 121 which upon engagement with the cam track 113 is depressed to open that one of its ports through which pressure fluid is delivered to the cylinder 109 for shifting the pallet grippers into their pallet locking position. The valve stem 121 remains depressed by the cam track and so maintains the pallet locked to the mold box until such time as the solenoid 119 is energized to swing the lower hinged section of the cam track outwardly to an extent sufficient to permit the valve stem to shift outwardly under the influence of its spring bias, whereupon the valve is conditioned to supply fluid pressure to the cylinder for retraction of its piston and consequent release of the pallet grippers from locking engagement with the pallet. Thus, when a given mold box at the discharge station C is ready to be stripped of its formed blocks, the pallet for that box is freed therefrom for movement downwardly as a support for the blocks discharged from the mold.

VIII. THE MECHANISM FOR VIBRATING THE MOLD BOXES AND FOR EFFECTING DISCHARGE OF THE FORMED BLOCKS FROM THE MOLD BOX AT THE DISCHARGE STATION OF THE MACHINE

This mechanism is best shown in FIGS. 2 to 6 inclusive wherein it will be observed that the floor-supported main base 11 of the machine mounts a horizontally disposed yoke, designated by the reference numeral 122, having a pair of arms 123—123 which are respectively pivotally supported beneath the revoluble drum 10 by a transversely extending shaft 124 suitably journalled in bearing blocks mounted on the machine base 11. The outer portions of the yoke arms 123—123 are turned inwardly toward each other and revolubly support between their outer extremities a cam follower 125 which is in constant engagement with a cam 126 keyed to a shaft 127 journalled between laterally spaced bearing blocks 128—128. This cam shaft 127 is coupled to and driven by a shaft 129 which in turn is driven by the electrically operated motor 18 through a second gear box 130.

This second gear box 130 also houses a conventional electro-magnetically-operated clutch and brake assembly (not shown) similar to that housed in the gear box 17, with its motor driven flywheel operative when clutched to the cam shaft 127 to effect a full revolution of the cam 126 after each quarter turn revolution of the drum 10 and while the latter is at rest. Just as the drum is caused to be rotated and braked against rotation by the electro-magnetically-controlled clutch disc of the clutch and brake assembly in the gear box 17, so is the cam 126 caused to be rotated and braked against rotation by the electro-magnetically controlled clutch disc of the clutch and brake assembly in the gear box 130. Thus, the two clutch and brake assemblies are operated sequentially and never both at the same time.

Practically instantaneous interruption in rotation of the drum 10 is effected as its vertically alined mold boxes respectively arrive simultaneously at the mold filling station A and the block discharging station C. At the instant of such arrival of a mold box at said station C, the low point of the cam 126 is in engagement with its cam follower 125 in consequence of which the yoke 122 is disposed with the inner extremities of its arms 123—123 in their maximum depressed position.

These inner ends of the yoke arms 123—123 which terminate above the central region of the floor pit 12 support an anvil assembly, designated generally by the reference numeral 131, by clevis type links 132—132 having their upper ends pivotally secured to the yoke arms, as at 133, and their lower ends pivotally secured, as by the pivot pins 134, to the base member 135 of the anvil assembly. This anvil base member 135 extends transversely across the top of the floor pit 12 in vertically spaced relation to the bottom of the drum 10, its transverse length being such that the opposite ends thereof respectively project beyond the opposite side walls of the drum (as see FIG. 5).

As most clearly appears in FIG. 2, the anvil base member is generally in the form of an open rectangular frame having its transversely extending parallel side members 136—136 suitably interconnected by end members 137—137, as well as by the intermediate cross members to which the clevis links 132—132 are connected.

Projecting upwardly from each end member 137 of the anvil base frame is a trapezoidally shaped support 138 for a pair of spaced electro-magnet pads 139—139, each pair of which electro-magnet pads is positioned for vertical alinement with the correspondingly paired steel pads 66—66 carried by the cruciform supporting structure for the mold boxes 23 as each such box is positioned at the block discharging station A.

It will be apparent that upon oscillation of the yoke 122 about the axis of its pivot shafts 124—124 by operation of the cam 126 acting upon the cam follower 125, the anvil assembly 131 will be raised and lowered within limits determined by the permissible movement of the yoke about its pivot.

The anvil assembly 131 is constrained to rectilinearly shift up and down along a vertical path of movement by guides 140—140 carried by the outer faces of the magnet pad supports 138—138 in embracing relation to fixed guide posts 141—141 mounted upon and extending vertically above the base frame of the machine. Two sets of these guides 140—140, each having wear pads such as are provided for the previously described guides 69—69 for the stripper assembly, are disposed in vertically spaced relation upon each outer side of the anvil assembly for slidable engagement with a guide post 141.

Mounted upon the base frame 135 of the anvil assembly 131 between the anvil supporting yoke arms 123—123 are a pair of laterally spaced hollow vibrator members 142—142, each of which is provided upon its upper surface with a pair of longitudinal spaced pads 143—143 formed of a resilient material, such as rubber or the like to serve as cushions engageable with that section of the cruciform frame which supports those mold boxes and which are in position to be vibrated, i.e. those located at stations A and C of the apparatus.

The vibrator members 142—142 are disposed above the floor pit 12 within which are mounted a pair of electrically operated vibrator motors 144—144, each of which is connected by a drive belt 145 to a pulley on a shaft 146 journalled in and extending longitudinally through each of the members 142—142. Keyed to each shaft 146 interiorly of the vibrator member 142 in which it is mounted are a pair of eccentric weights 147—147, the function which is to effect vibration of the anvil assembly 131 upon operation of the vibrator motors 144—144. Of course, both of the vibrator members 142—142 are vibrated simultaneously and thereby impart a vibratory action uniformly across the full width of the anvil assembly 131. The vibrations, while of high frequency, are of very low amplitude and thus do not impart any appreciable vertical movement to the mold boxes.

The drive belts 145—145 of the two vibrator motors 144—144 are so connected to the pulleys on the vibrator members 142 as to provide the same with a certain degree of slack when the latter members are in their most depressed position, in consequence of which the vibrator members when in such position are not subject to vibration even through the motors 144—144 be running. However, when the vibrators are raised by the anvil under the influence of the cam-operated anvil supporting yoke arms, the belts 145—145 are taughtened sufficiently for the motors 144—144 to drive the vibrating eccentrics 146—146 and so effect vibration of the anvil assembly 131. Thus, during operation of the machine the vibrator motors 144—144, together with the main drive motor 18, may be run continuously. If desired, however, the operation of the vibrator motors 144—144 may be controlled for intermittent operation by starting the same automatically as the hinged section 117 of the cam track 113 is swung out of the plane of said track upon energization of the solenoid 119 as above described and stopping the same automatically upon contact of the height control pins 168 and 169 of the height control mechanism hereinafter described. It will be noted that the vibrator motors 144—144 are floatingly mounted upon suitable supports (as see FIG. 4) so that as the anvil assembly 131 is raised and lowered by the cam-actuated movement of the yoke 122 about its pivotal support, the drive belts 145—145 of the vibrator motors are always maintained under proper operating tension.

(IX) THE HEIGHT CONTROL MECHANISM

As most clearly appears in FIGS. 5, 12, 14, 15 and 20, the beam assembly 63 for each mold box is provided at one end thereof inclose proximity to the pads 66—66 carried thereby with a height control pin 166 suitably mounted upon an extension of the pad-supporting plate 65. These height control pins for the several mold boxes I, II, III and IV which are all disposed adjacent the same one side of the revoluble drum, i.e., in a common vertical plane, are each of a length equal to the axial depth of the steel pads with which they are associated. The control pins 166 are each electrically insulated from the machine and are suitably provided with electrical terminal blocks 167 having conductor leads by which they may be suitably connected in electrical circuit with a source of electrical supply (not shown) for controlling the energization of the electro-magnetic pads 139—139 carried by the anvil frame member 138 above described.

The anvil frame member 138 also is provided at its upper end in close proximity to the electro-magnetic pads 139—139 carried thereby with an upwardly presenting height control pin 168 disposed in the same vertical plane which is common to the mold box height control pins 166. This upwardly presenting height control pin 168 is further so located that upon downward movement of the stripper shoe assembly of the mold box stationed at the block stripping station C it (the pin 168) is an axial vertical alinement with the control pin 166 associated with said mold box. As in the case of the mold box height control pins 166, which may be termed the upper height control pins, the lower control pin 168 carried by the anvil frame is also electrically insulated from the machine and is provided with a terminal block 169 for electrically connecting it in circuit with the electro-magnetic pads 139—139.

It will be apparent that upon vibration of the mold box at the block-stripping station C, the stripper shoe assembly of that box will settle gradually downward in the mold as the concrete mix therein is compacted. Since this vibration is effected after the anvil has been elevated to its upper limit by rotation of the cam 126 acting upon the pivoted anvil supporting yoke 122, upon such gradual downward movement of the stripper shoe assembly the upper height control pin 166 associated therewith will eventually engage the lower height control pin 168 when the latter is in its most elevated position. Upon such engagement of the height control pins 166 and 168, the circuit to the electro-magnet pads 139—139 is closed to thereby energize said pads at both sides of the anvil and so magnetically couple them to the steel pads 66—66 provided at opposite ends of the stripper shoe beam assembly 63, thereby maintaining the upper and lower height control pins in engagement until the electro-magnets 139—139 are de-energized to permit separation of the anvil from the block-supporting pallet 71 as the blocks are being stripped from their mold box.

At the same time, the engaged height control pins 166 and 168, which in reality serve as an electric circuit controlling switch, through suitable means (not shown) included in the circuit, initiate operation of the feed drawer operating motor 82 to effect retraction of the feed drawer from its mold charging position over the mold box positioned at the charging station A of the machine.

Since the stripper shoes 54 in each mold box are in fixed relation to the beam assembly 63 associated therewith, downward travel of the stripper shoes 54 in the mold box at the block stripping station C is effectively stopped the instant that the beam pads 66—66 engage the anvil pads 139—139. Simultaneously as the pads 66—66 engage the pads 139—139 to interrupt the gravitational downward travel of the stripper shoes, the height control pins 166 and 168 are engaged and complete the electrical circuit for electro-magnetic energization of the pads 139—139 and magnetic coupling of the stripper assembly to the fully elevated anvil. At the instant of such magnetic coupling, the pallet 71 of the mold box at station C will be held supported against the bottom end of that mold box by the underlying anvil members 142—142 and thus there is established a fixed depth of block between the stripper shoes and the pallet of the mold box at station C.

Although in the construction as illustrated, the coacting height control pins 166 and 168 are shown disposed at one side of the machine, it will be apparent that similar sets of said height control pins may be provided at the opposite side of the machine so that each of the opposite ends of each stripper shoe beam assembly is provided with an upper height control pin adapted to contact a vertically alined bottom pin carried by the anvil frame member 138. Of course, the two sets of coacting height pins thus provided for each mold box would be electrically connected in parallel for conjoint operation.

(X) THE LATERAL TRANSFER MECHANISM

Stationarily mounted centrally between the forward ends of the vibrator members 142—142 is a post 147a (see FIG. 3) in which is journalled a transversely extending shaft 148 having fitted upon each end a conveyor chain sprocket wheel 149. The sprocket wheels 149—149 are respectively in mesh with a pair of conveyor chains 150—150 having their rear ends suitably trained over a second pair of sprocket wheels 151—151 revolubly supported upon a shaft 152 extending transversely between a pair of fixed supports 153—153.

Also revolubly supported upon the shaft 152 are a pair of sprocket wheels 154—154 for a pair of conveyor chains 155—155 respectively spaced outboard of the vibrator members 142—142, each of which chains is trained over a forward sprocket wheel 156 carried by a fixed support 157. This last-mentioned set of conveyor chains is considerably shorter than the conveyor chains 150—150, their fore ends terminating short of the free ends of the pivoted yoke arms 123—123.

In addition to the two sets of conveyor chain sets just described, a third set of endless conveyor chains 158—158 is entrained over sprocket wheels 159—159 revolubly supported by the shaft 152 and sprocket wheels 160—160 keyed to a transversely extending drive shaft 161 adapted to be driven by an electric motor 162 spaced rearwardly well beyond the circle of the revoluble drum 10.

Since the several sets of conveyor chains are all interconnected, the motor 162 drives all of the chains in unison. It will be observed that the upper runs of the entire array of the conveyor chains are disposed in a common horizontal plane relative to which the anvil assembly 131 is vertically shiftable. Thus, when the anvil assembly is in its raised position, as most clearly shown in FIG. 3, the vibrator members 142—142 have their upper surfaces disposed above the horizontal plane of the upper runs of the conveyor chains. However, when the yoke 122 is engaged by the low spot of the yoke-swinging cam 126 so that the anvil assembly may drop to its lowermost position under the influence of its own weight and that of the mold box which it supports, the upper surfaces of the vibrator blocks 142—142 drop below the horizontal plane of the upper runs of the conveyor chains a distance sufficient to permit the formed blocks in the mold box 23 at the discharge station A to be fully stripped from said mold box with the pallet of that box in underlying supporting relation to the stripped blocks resting upon the conveyor chains.

To complete the conveying system, a roller type conveyor 163 or any other suitable type of conveyor is operatively connected to the discharge end of the endless chain conveyor array for transfer of the pallets supporting the formed blocks thereon to the kiln or to any other remote place for subsequent handling or storage of the blocks.

(XI) OPERATION OF THE APPARATUS

For a clear understanding of the operation of the apparatus above described, the several mold boxes 23 as shown in FIGS. 1 and 8 will be respectively referred to as mold box I, mold box II, mold box III and mold box IV, each of which in succession is adapted upon rotation of the drum to pass through the several stations A, B, C, and D of the machine. The odd numbered mold boxes I and III are carried by the cruciform mold supporting section 25, while the even numbered mold boxes are carried by the cruciform section 26. Also, it will be noted that the mold boxes are all similarly oriented about the axis of rotation of the drum 10 with their open ends presenting outwardly of the drum periphery. While the charging of the mold boxes with concrete mix is effected through these outer open ends thereof, these ends actually constitute the bottom ends of the molds. Thus, with the pallets in place over said open ends, when the mold boxes are each moved through 180 degrees from their loading station A to their stripping station C, the mold box is reversed end for end so that the blocks are stripped from the box with their outer open ends facing down and supported on a pallet. The top ends of the blocks stripped from a mold box at the block discharging station are contoured in accordance with the shape and contour of the stripping shoes bearing against the concrete mix in the mold and thus in the apparatus of the present invention the stripping shoes in each mold box determine the shape of the top surfaces of the blocks formed in the machine.

Assuming that the drum has been rotated into an arrested position presenting mold box I in its empty state at the charging station A with its block discharging end open for receiving a charge of the concrete mix from the supply hopper 74, the feed drawer 76 is actuated by its motor 82, simultaneously as the drum comes to rest, to move across the upwardly presenting open end of the mold with a charge of the concrete mix somewhat in excess of what is required to completely fill the mold box. During this initial charging of the mold box with concrete and until after the feed drawer is retracted, the upright section 25 of the supporting frame for the mold box I (and the mold box III) is raised out of engagement with and thus is not supported upon that pair of the chordally extending rests 103—103 which are carried by the drum in proximate relation to the bottom of said frame section. In this connection see FIG. 5 wherein the mold box frame just prior to charging the mold box at station A is shown supported upon the rest members 103—103.

Retraction of the feed drawer upon completion of the mold charging step is effected by reversal of its operating motor 82, during which retraction of the feed drawer 76 excess concrete mix is stricken from the top of the mold box I by the feed drawer front wall 80 operating as a strike-off plate.

Operating in timed relation with operation of the feed drawer 76, by any suitable electric control circuitry (not shown), is the motor 90A (FIG. 2) for driving the mechanism which feeds the pallets 71 into position to be engaged by the fluid-pressure actuated lever 98. Also operating in timed relation to the operation of the feed drawer is the valve (not shown) for supplying pressure fluid to one end or the other of the cylinder 94 for actuating the pallet-engaging lever 98 to pull the lever-engaged pallet 71 across and into mold-box closing position. This fluid pressure cylinder 94, as previously described, moves with the feed drawer 76 and as the latter is retracted the fluid-pressure actuated lever arm 98 in engagement with the pallet 71 resting on its inclined supporting rails 91—91 pulls said pallet into mold-closing position. During this movement of the pallet its forward edge scrapes over the open end of the now-filled mold box I to further remove any of the concrete mix which was not stricken-off by the strike-off plate of the retracted feed drawer.

Simultaneously as the feed drawer assumes its fully retracted position, which is its position as shown in FIG. 1, the cylinder 94 is actuated to retract its piston rod 96 and thereby swing the lever arm 98 to an extent sufficient to raise the hook-shaped end 100 of the arm above the plane of movement of the pallets on their support rails 91—91 so that upon subsequent forward movement of the feed drawer following a quarter turn clockwise rotation of the drum to charge the next mold box at the charging station (which would be mold box II as shown in FIG. 8), the arm 98 moving therewith will freely pass over the pallet for said mold box II and be in position to engage and draw said pallet into position to close the filled mold box II upon retraction of the feed drawer. Thus, as each of the mold boxes I, II, III and IV is filled with the concrete mix at the charging station, each has placed over its top open end a pallet 71 for closing the same.

When the mold box (e.g., mold box I) at the charging station A has been filled with the concrete mix and its open end closed off by its covering pallet 71 pulled into position by the retracting feed drawer, upon complete retraction of the feed drawer it actuates a switch (not shown) for supply of energizing current to the electro-magnetically-operated clutch and brake mechanism in the gear box 17 for clutching the running motor 18 to the shaft 15 to thereby effect a quarter turn rotation of the drum 10.

When the drum traverses about the first 5 degrees of such quarter turn thereof the stem 121 of the two-way valve 112 associated with the mold box I rides onto the inclined entrance end 120 of the semi-circular cam track 113 and is depressed against its normal spring bias to open the valve for supply of pressure fluid to the fluid pressure cylinders 109 to swing the two opposed sets of pallet grippers 101—101 for said mold box I out of their retracted position into their positions as shown in FIGS. 5 and 7 over the outer surface of the pallet 71 to engage and hold the same in position. The pallet 71 remains held in its mold box closing position throughout the remaining travel of the filled mold box from the charging station A to the block discharging station C, it being noted in this connection that the valve 112 for each filled mold box always remains operative to supply pressure fluid to the pallet gripper cylinders of the filled mold box until after that box completes its 180-degree rotation into the block unloading station C and its pallet has been engaged by the underlying support members 142—142 of the anvil assembly 131.

Thus, when mold box I is filled with concrete mix, and its open end closed by a pallet 71 as just described, upon initial rotation of said mold box I clockwise through an arc of about 5 degrees, its pallet will be locked in mold box covering position and will be held locked during the subsequent rotation of the drum for travel of said mold box I through station B and into its discharging station C. The same will be true for each of the mold boxes II, III and IV as they are successively filled with concrete mix at the charging station and shifted 180 degrees into their respective discharging positions at station C at the bottom of the drum.

When each filled mold box arrives at its block discharging station C, the free-floating section of the cruciform frame which supports the then vertically disposed mold boxes (e.g., mold boxes I and III shown in FIG. 8) will drop vertically within its guides 34 upon its supporting rest members 103—103 as above mentioned (as see FIG. 5 which shows the frame section 25 which carries the mold boxes I and III resting upon a pair of said support members 103—103). Assuming that mold box I at the top of the drum was the third box to have been filled with concrete mix in the order III–IV–I as viewed in FIG. 8, upon complete filling of the mold box I and placement of its covering pallet 71 in unlocked position over its open end as hereinbefore described, the mold boxes IV and III will have their pallets locked in place by the gripper members 101—101 for said boxes and the mold boxes I and III will be in vertically disposed relation with their supporting frame 25 resting upon the supports 103—103. Mold box III will be then acted upon as will now be described.

Upon arrival of the filled mold box (e.g. box III) at the block discharging station C and while the pallet 71 for that mold box is still locked in place by the grippers 101—101, further rotation of the drum is interrupted by de-clutching the running motor from the drum drive shaft through actuation of the electro-magnetically-controlled clutch and brake assembly in the gear box 17. This de-clutching of the motor from the drum is effected by suitable switch means (not shown) operating in timed relation to movement of the feed drawer at the top of the machine, the drum movement being arrested simultaneously as the feed drawer commences its forward movement toward its mold charging position. This interruption of rotation of the drum 10 which occurs upon completion of each quarter turn of the drum may be effected by any suitable means, such as a switch operative to de-energize the electro-magnetically-operated clutch and brake mechanism in the drive motor gear box 17 to brake the drive shaft 15 of the drum which switch is successively actuated by dogs or other elements (not shown) carried by the drum in 90 degree spaced relation.

Following such interruption of the drum movement, the main drive motor 18 is clutched to the cam drive shaft 129 through its own electro-magnetically operated clutch and brake assembly in the gear box 130 by a suitable switch (not shown) operating in timed relation to actuation of the switch for interrupting rotation of the drum 10. It will be noted at this point that when the drum 10 completes its quarter turn revolution and comes to rest with the concrete-loaded mold box III at the block discharging station C, the cam follower 125 carried by the pivoted yoke 122 supporting the anvil assembly 131 is engaged by the low portion of the cam 126 to hold the anvil assembly 131 in lowered position with its cushioned blocks 142—142 out of engagement with the covering pallet 71 of the mold box III.

As the cam 126 rotates it gradually depresses the cam follower 125 and correspondingly raises the anvil assembly 131 until the cushioned blocks 142—142 thereof engage the mold box pallet and lift the vertically disposed mold boxes and their supporting frame off of the fixed rests 103—103 in the drum 10. Just prior to such lifting of the vertically disposed mold boxes I and III off of the rests 103—103 by the anvil assembly 131 the steel pads 66—66 of the stripper assembly of mold box III will be slightly spaced from the magnet pads 139—139 of the anvil assembly, which spacing will be further slightly increased as the mold box frame is raised off its rests by the rising anvil assembly.

As soon as the cushioned anvil blocks 142—142 engage the pallet 71 of the mold box III (as see FIG. 5) and so take over support of the latter mold box (as well as of the vertically spaced mold box I at the top of the drum), the solenoid 119 is energized by suitably timed switch means (not shown) to swing the hinged section 117 of the valve track 113 out of the plane of said track to thereby activate the fluid pressure cylinders 109—109 associated with the lowermost set of the pallet grippers 101—101 for disengagement of the latter from the pallet 71 underlying the inverted mold box III at the block discharging station C of the machine.

Rotation of the cam 126 is interrupted for a predetermined interval of time when the anvil assembly 131 is raised into its fully elevated position as shown in FIG. 3.

During this dwell of the cam 126, the belts 145 of the vibrator motors 144 are tautened sufficiently to effect vibration of the mold box III at the bottom of the machine and the mold box I at the top of the machine. Also during this period of vibration the feed drawer 76 will have been positioned above the stationary mold box I for charging the latter with its load of the concrete mix and consequently upon vibration of the anvil blocks 142—142 both the filled mold at the bottom of the machine and the mold being filled at the top of the machine will be subjected to the vibratory action of the vibrator motors to compact the mix in these boxes and so eliminate voids and air pockets therein.

As the vertically spaced mold boxes are thus vibrated during the period of dwell of the cam 126, i.e., while the anvil assembly 131 is held stationary in its fully raised position, the stripper shoes in the mold box at the block unloading station C gradually gravitate downwardly until the pads 66—66 associated therewith engage the pads 139—139 of the raised anvil assembly. The stripper shoes in the mold box will, of course, have been so preliminarily adjusted relatively to the beam assembly 63 as to provide a downward travel thereof (limited by the raised stop pads 139—139) requisite to produce a block of predetermined height and density. Simultaneously as the downward gravitational travel of the stripper shoes is stopped by engagement of the pads 66—66 and 139—139, the height control pins 166 and 168 will also be engaged to complete an electrical circuit through suitable switches, relays and other conventional means (not shown) to effect:

(1) energization of the electro-magnet pads 139—139 for magnetically coupling the stripper shoe assembly 63 to the anvil assembly 131;

(2) resumed rotation of the cam 126 for lowering the anvil assembly and so interrupting further vibration of the mold boxes supported by the anvil; and (3) withdrawal of the feed drawer 76 from its charging position above the mold box at station A into its fully retracted position shown in FIG. 1.

As the cam 126 resumes its rotation relatively to its cam follower 125, the latter rides onto and about the low portion of the cam to thereby permit the anvil supporting yoke arms 123—123 to gradually swing downwardly about the yoke pivot 124 and so effect corresponding lowering of the anvil assembly 131 by the force of gravity acting under the combined weight of the anvil assembly, the stripper assembly magnetically coupled thereto and the load of the concrete blocks in the mold box III. Almost immediately after said downward movement of the anvil assembly commences, the supporting frame for the vertically disposed mold boxes is reseated upon its rests 103—103 at the bottom of the drum 10.

As the cam 126 completes the second half of its single revolution for down travel of the anvil assembly 131 the mold box supporting frame is re-seated upon its rests 103—103, but the stripper assembly continues moving downwardly under the pull of the magnetically coupled anvil and stripper assemblies until the major portions of the formed blocks in the fixedly positioned mold box are extruded therefrom. Preferably, about three quarters of the length of the block is so stripped from the mold box while the stripper shoes remain magnetically coupled to the downwardly moving anvil assembly.

At this point along the downward movement of the anvil assembly, it actuates a micro-switch or other suitable means (not shown) to de-energize the electromagnet pads 139-139, thereby permitting the anvil to complete its downward movement free of the stripper shoe assembly. As the anvil thus completes its down movement, the formed blocks carried by the pallet which in turn is supported on the down-moving anvil, move downwardly under the combined weight of the blocks and the stripper assembly until they are completely stripped from the mold, as shown in FIG. 20. During the last portion of its down movement, the pallet-supporting members 142— 142 of the anvil assembly will pass below the horizontal plane of the conveyor chains 150—150 and as they do so the pallet-supported blocks stripped from the mold box will be deposited on said conveyor chains for lateral transfer of the blocks away from the machine as previously described. When the anvil assembly reaches its lowermost limit of movement, the cam shaft 129 is de-clutched from the motor 18 by suitable electrical control means to bring the cam 126 at rest with its low point in engagement with the cam follower 125. This control means, which may be a micro-switch or other suitable circuit controlling device, may be actuated either by the anvil assembly as it reaches its fully lowered position or by the feed drawer as it arrives at its fully retracted position. The fore and aft movement of the feed drawer is controlled by suitably located limit switches (not shown) in circuit with its operating motor 82 and thus, upon each complete retraction of the feed drawer from its mold charging position at station A of the machine, the drum 10 will be operatively clutched to the drive motor 18 through its gear box 17 for a quarter turn rotation thereof as hereinbefore described simultaneously as the cam 129 is de-clutched from said drive motor through its gear box 130.

It will be apparent from the foregoing that during any continuous production run of the machine, empty mold boxes will be successively presented at the side station D and filled mold boxes at the side station B, and that upon each cycle of operation of the machine, i.e., upon each quarter turn of the drum 10, a pair of mold boxes will be respectively positioned in vertically spaced relation at the top and bottom of the machine for simultaneously filling the top mold with concrete and unloading the bottom mold of formed blocks. The mold boxes at the side station B and D are supported by the horizontally disposed section of the mold box supporting frame, but are not subject to vibratory action since it is only the vertically disposed section of the mold box cruciform supporting frame which is free floating and adapted to be vibrated under the influence of the vibrating support blocks 124—124 of the anvil assembly when the latter is fully raised.

While the hereinbefore described operation of the machine may be effected automatically by way of any suitable electrical circuitry which would include conventional micro-switches, timing devices, relays and other circuit operating components functionally integrated and timed to provide the desired sequence of operations of the inter-related operating mechanism of the machine as hereinbefore described, it will be understood that the several operating mechanisms of the machine may be selectively operated in their requisite timed relation by manual control and operation of their operating motors and the fluid pressure valves associated therewith.

Whether automatically or manually operated, this sequential (cyclic) operation of the several described mechanisms of the machine is diagrammatically shown in the charts of FIGS. 31 and 32. The base lines of these charts represent the overall time for intermittent movement of the drum through its four quarter turns and for a complete revolution of the anvil cam following each quarter turn of the drum. The chart of FIG. 31, however, shows the operations performed upon a single mold box as it moves through all four stations of the machine upon each 360 degree revolution of the drum, while the chart of FIG. 32 shows the operations as they are being performed upon all of the mold boxes carried by the drum at any selected instant of time during operation of the machine.

Thus, referring to FIG. 31, it shows that when an empty mold box is brought to a position of rest at station A by a first quarter turn of the drum, the feed drawer advances and retracts to completely fill the mold box with concrete and place in position its covering pallet. As the feed drawer advances over the mold box the anvil lifts its supporting frame section free of its bottom seats and during the dwell period of the anvil while at its fully raised position, the mold box is vibrated to compact the concrete mix with which the box is being charged. It will be noted that some charging of the mold box continues as the feed drawer is being retracted and that the covering pallet assumes its final unlocked position over the open end of the mold box when the feed drawer is completely retracted and the anvil is fully depressed and comes to rest.

The drum now makes it second quarter turn to move the filled mold box to station B and as it traverses the first 5 degrees or so of this second quarter turn, the pallet is locked to the mold box. Thus, as the FIG. 31 chart shows, when the filled mold box arrives at station B, its pallet is locked in position to hold intact within the mold box its concrete content. Although the feed drawer advances and retracts and the anvil rises and falls following the second quarter turn of the drum, their operation has no effect upon the filled mold box at station B.

Following the third quarter turn of the drum to move the concrete-filled, pallet-locked mold box to the block unloading station C, the rising anvil takes over support of the mold box (now in inverted position) and during the period of dwell of the anvil the filled mold box is vibrated. However, as the charts show, prior to this vibration, the pallet of the mold box is unlocked, which unlocking occurs upon rise of the anvil into engagement with the pallet.

Also, while the filled mold box is at station C, and during the vibration thereof, the height control pins are engaged and magnetic coupling effected between the stripper shoe assembly and the anvil assembly. The magnetic coupling continues in effect as the anvil is lowered sufficiently to extrude a major portion of the blocks from the mold box, whereupon the magnetic coupling is broken to allow the pallet-supported blocks to be stripped under the force of gravity from the mold box as the anvil continues to move downward into its fully lowered position. Actually, as the FIG. 31 chart shows, the pallet-supported blocks are completely stripped from the mold box and deposited upon the lateral transfer conveyor just prior to completion of the downward travel of the anvil.

The foregoing operations are all completed within a 180 degree revolution of the drum, which includes but two quarter turns of the drum (to wit, the second and the third shown in the FIG. 31 chart).

Upon the final or fourth quarter turn of the drum, all that happens in respect to the stripped mold box is to move it in empty condition and without any associated pallet to station D from whence it will be moved into the charging station A upon the next quarter turn of the drum.

Referring now to the chart of FIG. 32, it shows that following each quarter turn of the drum, while the mold box at station A is being filled with concrete, vibrated and covered with a pallet, the mold box at station C is having its pallet unlocked, is also being vibrated to produce blocks of the desired depth and is being stripped of such blocks for transfer thereof away from the machine by the lateral conveyor mechanism. It will be noted that vibration of the mold box being filled at station A occurs simultaneously with vibration of the filled mold box at station C and that the mold boxes at stations B and D are not subject to any vibration. It will be noted also that as each mold box filled at station A is moved about 5 degrees toward station B, the pallet placed over the open end of the mold box while it was at station A is locked in position and remains so locked to the mold box until it is released prior to vibration of the box, i.e., when the rising anvil takes over the support of the vertically disposed section of the mold box supporting frame. The pallet remains unlocked during subsequent stripping of the formed blocks from the mold box and transfer thereof to the lateral conveyor mechanism.

Further, the chart of FIG. 32 shows that at station C the magnetic coupling between the anvil and the stripper shoe assembly of each mold box occurs when the stripper shoe assembly has gravitated downwardly in the mold box as the latter is vibrated to the point where the height control pins are engaged and that the formed blocks are completely stripped from each mold box at station C just prior to when the anvil reaches its lowermost limit of travel.

It will be apparent that the block-producing system of the present invention has a number of advantages over all of the known conventional block-producing systems. Since the concrete mix is fed into the mold box through the same unrestricted open end thereof from which the formed blocks are stripped, faster and more efficient charging of the mold boxes is obtained. Also, due to the fact that the filled mold box is reversed end for end for stripping of the blocks therefrom, the stripper shoes may be variously shaped to produce blocks having their top surfaces contoured to any desired irregular shape, e.g., curved, scalloped, convex, concave, pyramidal, saw-toothed, etc.

The molded units produced may be of any size and perimetral shape within the limits imposed by the overall inside dimensions of the mold box and the shape of the unit-forming cavities thereof and so may be in the form of curbing, sills, lintels and other such structural elements of lengths up to 54 inches and depths of from 2 to 14 inches. As previously stated, a 4-mold machine with each mold box set up to produce 18 blocks and with the drum operating at the rate of 150 quarter turns per hour would have a production capacity of 2700 blocks per hour.

Also, by setting up each mold box for production of a different shape or size of block, of the system of the present invention enables the production from a single machine of blocks such as would normally require the operation of four conventional machines running at the same time.

Further, since the formed units as stripped from each mold box at station C are supported by the pallet of that box, the green blocks are ready for cube stacking thereof and may be transferred while on their supporting pallets to and into the curing kilns with minimum handling of the uncured blocks.

Finally, since charging of the mold boxes, compacting the concrete mix therein and stripping the formed blocks from the mold boxes is effected primarily under the force and influence of gravity, the system of the present invention requires a minimum of working parts and maintenance service.

It will be understood that the present invention is susceptible of various changes and modifications which may be made from time to time without involving any departure from the general principles or real spirit thereof. Accordingly, it is intended to claim the same broadly, as well as specifically, as indicated in the appended claims.

What is claimed as new and useful is:

1. A masonry block forming machine comprising in combination a drum revoluble about a horizontal axis, power means operative to revolve said drum step by step about its axis, a plurality of open-ended mold boxes carried by said drum in uniformly spaced relation about its periphery with an open end of each of said boxes disposed substantially flush with the rim of the drum and presenting radially outwardly thereof, said mold boxes corresponding in number to the number of steps to which the drum is subjected during each revolution thereof, shiftable stripper means fitted in each mold box in spaced relation to its open end to form the bottom of the mold box cavity, means at the top of said drum for successively charging each mold box with a predetermined volume of block molding material, means also at the top of said drum for placing a pallet in covering position over the open end of each mold box fully charged with said moldable material, means operative to hold each said pallet locked in its covering position on its associated mold box to retain the charge within said box as the latter is rotated from its upright position at the top of the drum into an inverted position at the bottom of the drum, means at the bottom of the drum for engaging the pallet of said inverted fully charged mold box preliminarily to unlocking said pallet and stripping the blocks from the mold box through the charging end thereof while supported upon its said unlocked pallet, a mold box supporting frame mounted within said drum for vibratory movement diametrically of said drum, said frame having rigidly secured to each opposite end thereof one of said mold boxes, and means for effecting vibration of said frame and correspondingly of said mold boxes secured thereto when said drum is rotated into a position of rest with said frame extending vertically to respectively locate said mold boxes at the top and at the bottom of said drum with their corresponding ends presenting in opposite directions.

2. A masonry block forming machine as defined in claim 1 wherein said mold box supporting frame is of generally cruciform shape having a pair of relatively shiftable orthogonally related sections, each of said sections having rigidly secured to its outer end one of said mold boxes, said frame sections being sequentially disposable in a vertical position as said drum is rotated to respectively present the mold boxes secured thereto at the top and at the bottom of said drum, each said frame sections when so vertically disposed being adapted to be vibrated by said vibrating means to simultaneously vibrate the mold boxes secured thereto without effecting vibration of its orthogonally related frame section and the mold boxes associated with the latter section.

3. A masonry block forming machine as defined in claim 1 wherein said mold box supporting frame is provided with a plurality of angularly related relatively shiftable sections extending diametrically of said drum, each of said sections having rigidly secured to each opposite end thereof one of said mold boxes, said frame sections being sequentially disposable each in a vertical position as said drum is rotated to respectively present its associated mold boxes at the top and bottom of said drum, each of said frames when so vertically disposed being adapted to be vibrated by said vibrating means to simultaneously vibrate its associated mold box without effecting vibration of the other frame sections and their respectively associated mold boxes.

4. In a system for automatically producing masonry blocks or the like of predetermined dimensions and top surface configurations,
  (a) a revoluble drum rotatable in a vertical plane about a horizontal axis relatively to a plurality of stations located at fixed points spaced uniformly about the periphery of the drum with at least one of said stations positioned above the top and another of said stations positioned below the bottom of said drum;
  (b) a plurality of mold boxes uniformly spaced about and carried by said drum equal in number to the number of said stations, said mold boxes being each disposed with an open end thereof presenting radially outward of the drum axis, each of said mold boxes being thereby adapted to be filled with block molding material and to be stripped of the blocks formed therein by way of said outwardly presenting open end thereof;
  (c) means operative to effect step by step rotation of said drum to sequentially position each of said mold boxes at each of said stations;
  (d) means at the station above the top of the drum for charging each mold positioned at said station;
  (e) additional means at said station above the top of the drum for closing off the open end of each fully charged mold box with a covering pallet;
  (f) a mold box supporting frame shiftable diametrically within said drum, said frame having rigidly secured to each of its opposite ends one of said mold boxes,
    (1) means for supporting said frame in a rest position when said drum is so rotated as to respectively position the mold boxes of said frame at said mold box charging station and at said block stripping position, and
    (2) means for effecting rectilinear vibratory motion of said frame for a predetermined interval of the period during which said mold boxes are in their aforesaid positions to simultaneously vibrate said mold boxes; and
  (g) means at the station below the bottom of the drum for stripping the blocks from each mold box following the vibration of the mold boxes at the charging and block stripping stations.

5. A system as defined in claim 4 wherein only those mold boxes which are respectively positioned at the mold box charging station and at the block stripping station are subjected to vibration.

6. A system as defined in claim 4 wherein means is provided for locking the pallet to its associated mold box during substantially the period of travel of said mold box from said charging station to said block stripping station.

7. A system as defined in claim 4 including means for releasably securing each pallet in mold box closing position immediately following movement of each fully charged mold box out of said charging station and toward said block stripping station.

8. A system as defined in claim 4 including means for releasably locking each pallet in mold box closing position immediately following movement of each fully charged mold box out of said charging station and toward said block stripping station and means for effecting release of each such pallet from locked engagement with its associated mold box immediately after the latter assumes an arrested position at the block stripping station.

9. A system as defined in claim 4 including a block ejecting platen adjustably set in each mold box in spaced relation to said open end thereof to form the bottom wall of a mold cavity of predetermined depth, the surface of said platen facing said open end of the mold box being contoured to a shape corresponding to that desired for that face of the to-be-molded block which is opposite the face engaged by the covering platen.

10. A system as defined in claim 9 wherein said block ejecting platen is shiftable toward said open end of the mold box to express therefrom the block formed therein and wherein is included means for so shifting said platen when the charged mold box is positioned at the block stripping station with its said open end covered by said pallet presenting downwardly whereby to effect discharge of the formed block from said mold box while supported upon its underlying pallet.

11. Apparatus for automatically producing masonry block and the like comprising in combination
  (a) a mold box adapted to be filled with a predetermined volume of block molding material through an open end thereof presenting upwardly during the charging operation,
  (b) means for applying a pallet over said open end of the mold box when the same is fully charged to close off said open end,
  (c) means for locking said pallet in its mold closing position,
  (d) means for inverting said mold box end for end while maintaining said pallet locked thereto,
  (e) vertically moveable means underlying said pallet-closed mold box in its said inverted position,
  (f) means for elevating said underlying means into engagement with said pallet to thereby support said inverted fully charged mold box,
  (g) means for unlocking said pallet from said mold box upon said engagement of said elevating means with said pallet,
  (h) a stripper shoe assembly having a platen disposed interiorly of the mold box in spaced relation to said pallet to form the bottom wall for each block-forming cavity of the mold box, (i) means for vibrating the inverted mold box while supported by said underlying pallet-engaging means, (j) means for allowing limited downward movement of each said platen in its mold cavity during vibration of the mold box to compact the material therein to produce blocks of predetermined depth, and (k) means for coupling said stripper shoe assembly to said vertically movable pallet engaging means whereby upon lowering of said pallet engaging means the blocks are stripped from the mold box by the force developed by the combined weight of said stripper shoe assembly and said vertically movable pallet engaging means.

12. Apparatus as defined in claim 11 wherein said coupling means includes coacting elements respectively carried by said stripper shoe assembly and said vertically movable pallet engaging means which, when mechanically engaged, are magnetically coupled together.

13. Apparatus as defined in claim 11 wherein said coupling means is electromagnetically actuated and wherein is included means for disengaging said coupling means during lowering of said pallet engaging means and just prior to complete stripping of the formed blocks from said inverted mold box whereby as said pallet engaging means is further lowered to the limit of its downward movement the formed blocks resting upon said pallet are completely withdrawn from the mold box.

14. Apparatus as defined in claim 13 including block transfer means extending laterally of said vertically movable pallet-engaging means in a horizontal plane spaced below the inverted mold box at a level to receive thereon the pallet with its load of blocks stripped from said mold box.

15. Apparatus for continuously molding masonry blocks and the like of moldable material comprising a plurality of mold boxes supported in paired oppositely presenting relation upon a supporting structure adapted to be rotated step by step about a horizontally extending axis from one vertically disposed position thereof into another such position whereby to sequentially locate each of said paired mold boxes first at one and then at another of two stations vertically spaced apart to embrace said paired mold boxes therebetween, each of said mold boxes having an open ended block-forming cavity presenting endwise of its supporting structure, blockstripping means associated with each mold box including a stripper shoe forming the bottom wall of each cavity of the mold box, means for simultaneously vibrating the paired mold boxes, respectively located at said two vertically spaced apart stations, without at the same time vibrating any other of said paired mold boxes, a pallet associated with each mold box to close off its open end, power-operated means for effecting step by step rotation of said mold box supporting structure, a relatively fixed seat for stationarily supporting said structure in each of its stepped positions, and an anvil mechanism including a vertically shiftable platform adapted when elevated to engage the pallet of the mold box at the bottom one of said two stations to raise said structure free of said fixed seat for vibration of said structure and the mold boxes supported thereby.

16. Apparatus as defined in claim 15 wherein said block-stripping means is shiftable in its associated mold box upon vibration thereof to compact the material therein for production of a block of pre-determined depth and density and which includes means for coupling together said anvil platform and said block-stripping means following said vibration whereby upon lowering of said anvil mechanism the pallet engaged by said platform is withdrawn from its associated mold box together with the blocks formed therein by the pressure exerted thereon under the combined weight of said stripper shoe assembly and said vertically shiftable anvil platform.

17. Apparatus as defined in claim 15 including laterally shiftable feed means for supplying moldable material to each of said mold boxes at the topmost one of said vertically spaced stations and means for delivering one of said pallets to each charged mold box upon retraction of said feed means from its mold box charging position.

18. Apparatus as defined in claim 15 wherein each said pallet is delivered to its mold box from a supply thereof spaced laterally from the mold box at the charging station and which includes means coupled to said feed means for engaging and drawing said pallets from said supply one at a time to and over the fully charged mold box.

References Cited

UNITED STATES PATENTS

| | | | |
|---|---|---|---|
| 614,606 | 11/1898 | Black. | |
| 816,374 | 3/1906 | Pratt | 25—80 |
| 923,595 | 6/1909 | Sprenger | 25—81 |
| 2,317,574 | 4/1943 | Williams. | |

FOREIGN PATENTS

| | | |
|---|---|---|
| 124,858 | 5/1958 | U.S.S.R. |

J. SPENCER OVERHOLSER, Primary Examiner

R. S. ANNEAR, Assistant Examiner

U.S. Cl. X.R.

25—41